(12) United States Patent
Market et al.

(10) Patent No.: US 10,197,691 B2
(45) Date of Patent: Feb. 5, 2019

(54) ACOUSTIC ANISOTROPY AND IMAGING BY MEANS OF HIGH RESOLUTION AZIMUTHAL SAMPLING

(75) Inventors: Jennifer Anne Market, Rosehill, TX (US); Gary D. Althoff, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 429 days.

(21) Appl. No.: 12/922,978

(22) PCT Filed: Apr. 1, 2009

(86) PCT No.: PCT/US2009/039101
§ 371 (c)(1),
(2), (4) Date: Sep. 16, 2010

(87) PCT Pub. No.: WO2009/124115
PCT Pub. Date: Oct. 8, 2009

(65) Prior Publication Data
US 2011/0019501 A1    Jan. 27, 2011

Related U.S. Application Data

(60) Provisional application No. 61/041,974, filed on Apr. 3, 2008.

(51) Int. Cl.
*G01V 1/00* (2006.01)
*G01V 1/50* (2006.01)

(52) U.S. Cl.
CPC .................................. *G01V 1/50* (2013.01)

(58) Field of Classification Search
USPC .............................................. 367/34
See application file for complete search history.

(56) References Cited

U.S. PATENT DOCUMENTS

| | | | |
|---|---|---|---|
| 4,881,208 A | 11/1989 | Liu | |
| 5,311,484 A | 5/1994 | Anderson et al. | |
| 5,678,643 A | 10/1997 | Robbins et al. | |
| 5,784,333 A * | 7/1998 | Tang et al. | 367/30 |
| 6,188,961 B1 | 2/2001 | Mandal | |
| 6,366,531 B1 | 4/2002 | Varsamis et al. | |
| 6,477,112 B1 * | 11/2002 | Tang et al. | 367/38 |
| 7,035,165 B2 | 4/2006 | Tang | |
| 7,039,524 B2 * | 5/2006 | Haugland | G01V 1/48 702/18 |

(Continued)

OTHER PUBLICATIONS

Patent Office of the Cooperation Council for the Arab States of the Gulf, Examination Report in Application GCC/P/2009/13194, which is the GCC counterpart application to the instant application, Oct. 22, 2014.

(Continued)

*Primary Examiner* — James R Hulka
(74) *Attorney, Agent, or Firm* — Howard L. Speight, PLLC

(57) ABSTRACT

In an acoustic logging system utilizing one or more acoustic sources, each with a specified radiation pattern around a source orientation, an acoustic signal is transmitted into a formation with a source oriented in a first source orientation. An acoustic waveform is received in response with a receiver oriented in a first direction. The slowness of the formation in the first direction is calculated using the received acoustic waveform.

12 Claims, 24 Drawing Sheets

(56) References Cited

U.S. PATENT DOCUMENTS

| | | | | |
|---|---|---|---|---|
| 7,089,118 B2* | 8/2006 | Haugland | ................ | G01V 1/48 702/18 |
| 7,518,949 B2* | 4/2009 | Haugland | ................ | G01V 1/48 367/25 |
| 2004/0158997 A1* | 8/2004 | Tang | ................ | 33/304 |
| 2005/0185510 A1* | 8/2005 | Haugland | ................ | G01V 1/48 367/57 |
| 2006/0106542 A1* | 5/2006 | Haugland | ................ | G01V 1/48 702/14 |
| 2006/0285439 A1* | 12/2006 | Haugland | ................ | G01V 1/48 367/75 |
| 2007/0097788 A1* | 5/2007 | Tang et al. | ................ | 367/52 |
| 2008/0151690 A1 | 6/2008 | Tang et al. | | |
| 2008/0298174 A1 | 12/2008 | Tang et al. | | |

OTHER PUBLICATIONS

United Kingdom Intellectual Property Office, Examination Report under Section 18(3), Application GB1014597.7, which is the UK counterpart of the instant application; dated Feb. 22, 2012.

United Kingdom Intellectual Property Office, Notice of Grant for patent application GB1014597.7, which is the UK counterpart of the instant application; dated May 8, 2012.

Perbadanan Harta Intelek Malaysia Intellectual Property Corporation of Malaysia, Substantive Examination Adverse Report (Section 30(1) / 30 (2)), Application No. PI 2010004428, which is an MY counterpart to the instant application, dated May 15, 2015.

Patent Office of the Cooperation Council for the Arab States of the Gulf, Examination Report in Application No. GCC/P/2009/13194, which is the counterpart GCC application to the instant application, signed by the Director of Substantive examination department dated Apr. 6, 2014.

Examiner's first report on patent application No. 2009231758 (Australian national phase application of PCT/US2009/039101), IP Australia, dated Mar. 29, 2011.

Notice of Acceptance Examiner's on patent application No. 2009231758 (Australian national phase application of PCT/US2009/039101), IP Australia, dated Dec. 1, 2011.

Patent Office of the Cooperation Council for the Arab States of the Gulf, Examination Report, Application No. GCC/P/2009/13194, which is a GCC counterpart to the instant application, dated Sep. 15, 2014.

"PCT Search Report", PCT/US2009/39101, (dated Jun. 8, 2009).

* cited by examiner

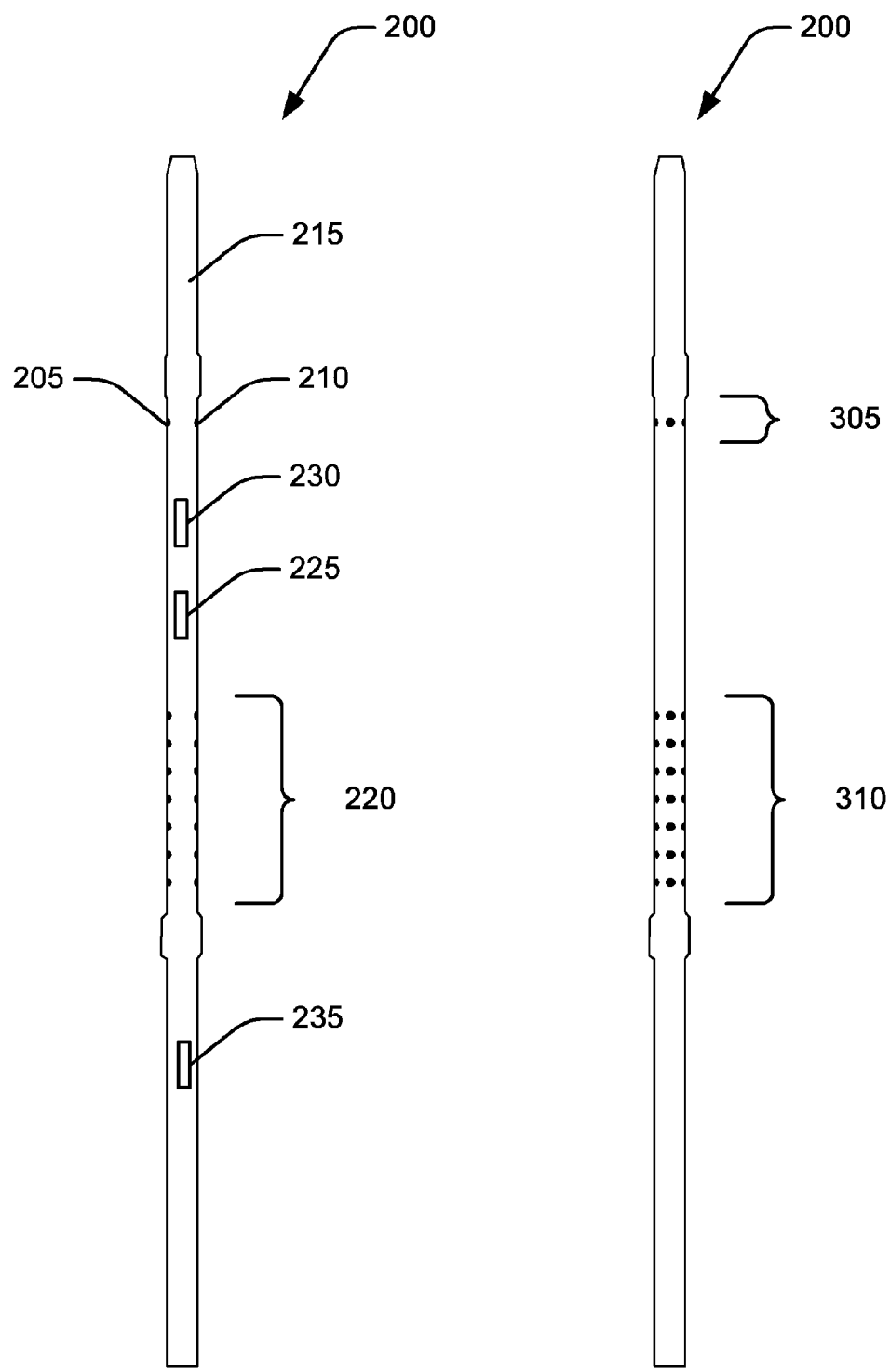

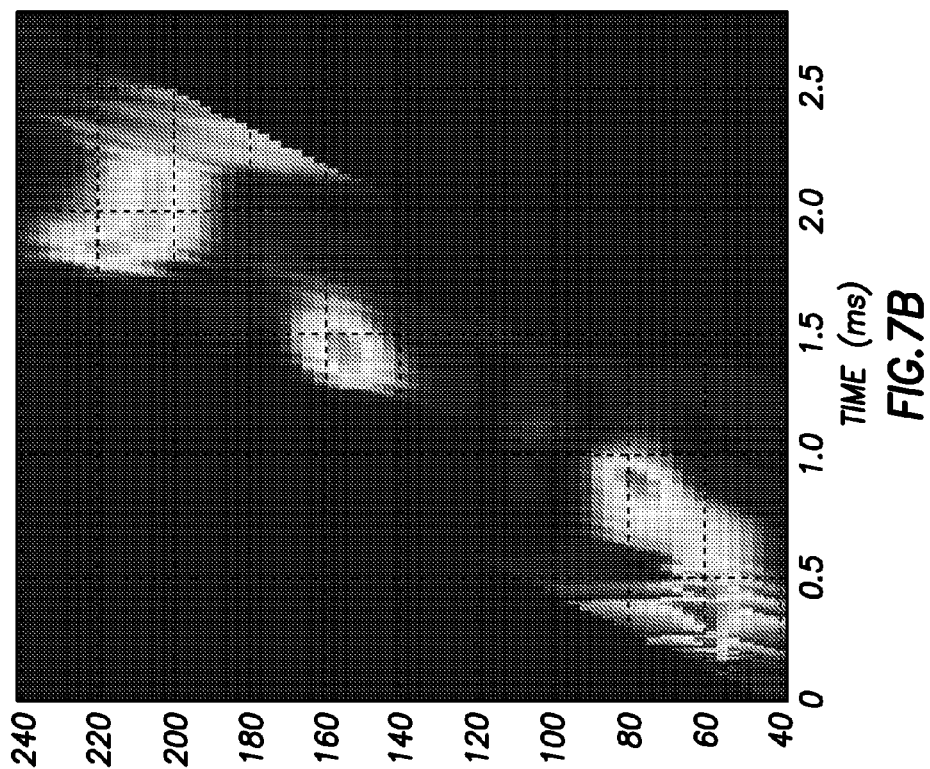
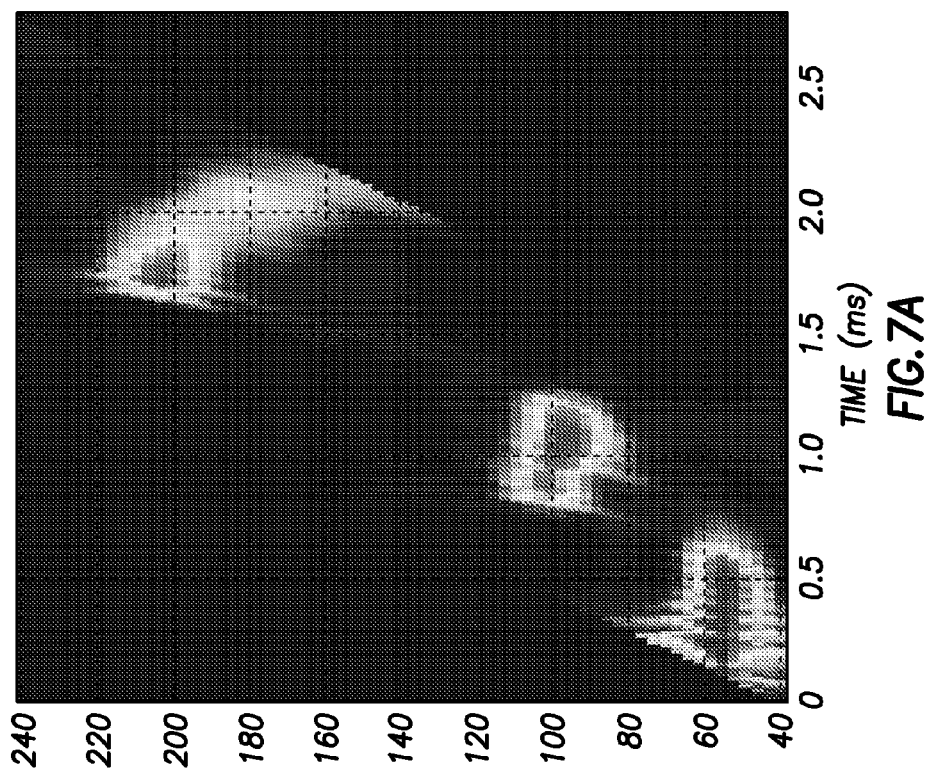

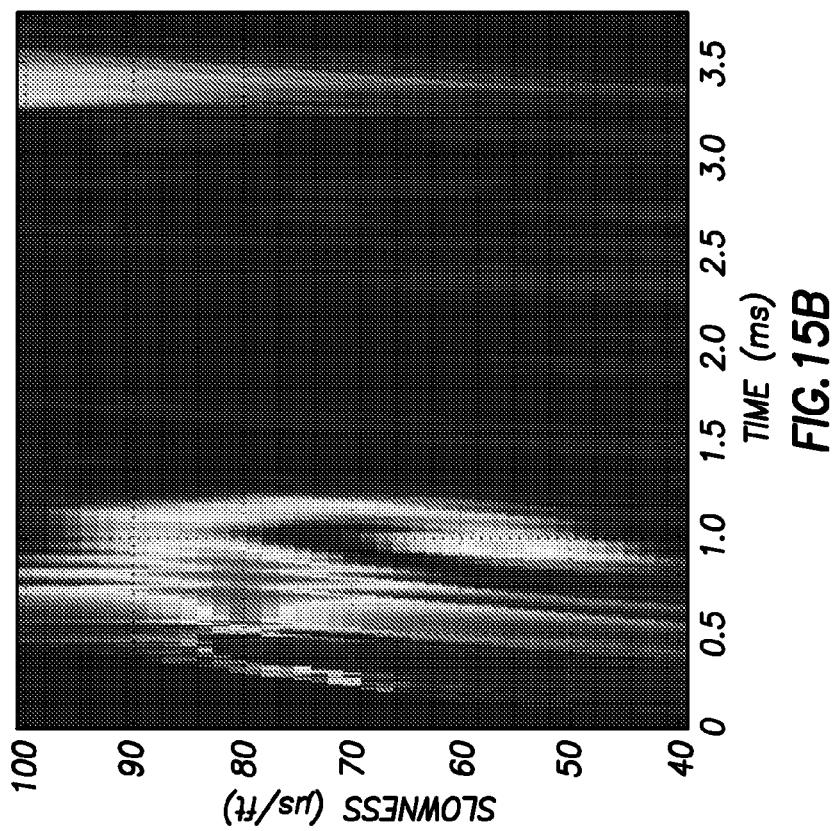
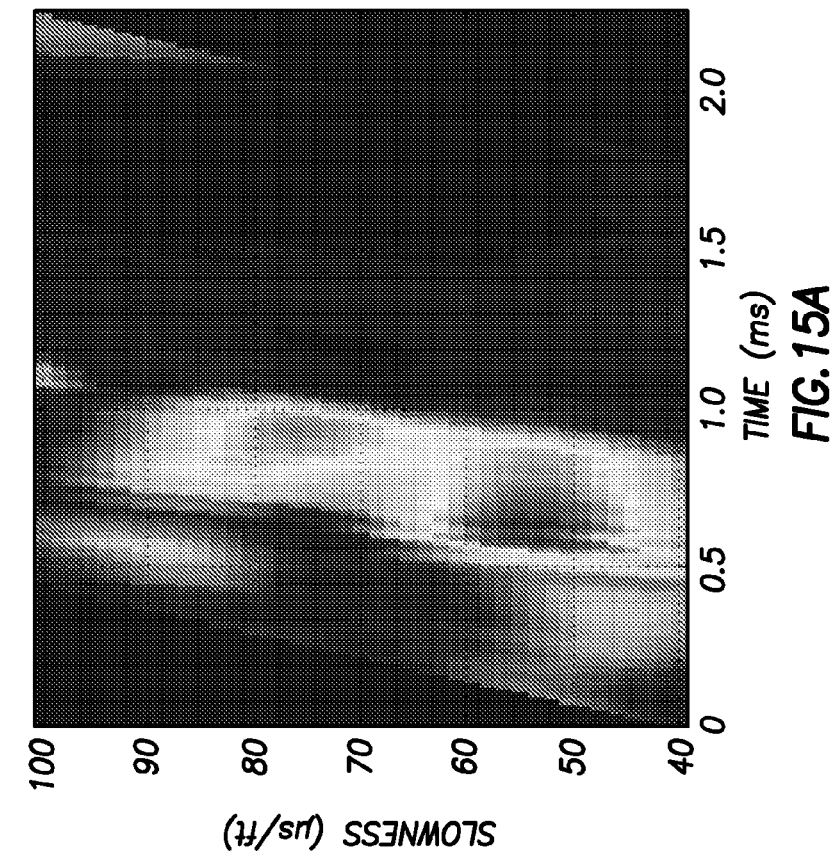

ACOUSTIC ANISOTROPY AND IMAGING BY MEANS OF HIGH RESOLUTION AZIMUTHAL SAMPLING

This application claims priority from U.S. Provisional Application Ser. No. 61/041,974, entitled "Acoustic Anisotropy and Imaging by Means of High Resolution Azimuthal Sampling," filed on Apr. 3, 2008.

BACKGROUND

Azimuthal sonic measurements are currently made commercially by major service providers in the wireline domain in the form of crossed-dipole shear anisotropy. Because wireline tool do not rotate quickly in the well bore (they typically rotate once every few minutes, not multiple times per second as in the case of logging-while-drilling ("LWD") tools), they cannot easily acquire data at many azimuths.

Existing wireline systems use a crossed-dipole tool, which is a tool with a dipole source firing in the x-direction and a second dipole source firing in the y-direction. Typically, x- and y- are not acquired simultaneously, but as close as can be without the signals overlapping yet still being considered to be at the same depth. There are typically arrays of receivers located on the x- and y-axis. The signal from the x dipole source is recorded on the x receivers and y receivers, these datasets being labeled XX and XY respectively. The signal from the y dipole source is recorded on the x receivers and y receivers, these datasets being labeled YX and YY respectively. Through Alford rotation, waveform inversion, or a combination of various techniques, and accounting for tool centralization, source and receiver matching, and a circular borehole, an estimated predicted waveform set at each angle around the well bore can be computed from the 4 sets of acquired waveforms. Various computational methods can then be employed to determine the maximum and minimum shear slowness and the angle of the anisotropy. The waveforms at angles other than the 4 sets measured are inferred or estimated and may not be directly measured.

In these methods if the tool is oriented in line with the anisotropic field, the tool would see no variation on the crossline axis, and the anisotropy would be missed. In addition, these methods might not be as sensitive in complex anisotropic regimes where there is depth-of-investigation variation in the flexural mode response. It is also challenging to acquire a good flexural mode response and separate it from the Stoneley wave. In addition, large errors can occur in anisotropy calculations, and indeed trying to measure anisotropy at all, with a wireline tool in a horizontal hole where the tool is off-centered (e.g., lying on the bottom of the hole).

Existing systems use wireline crossed-dipole tool design.

BRIEF DESCRIPTION OF THE DRAWINGS

FIGS. 2 and 3 illustrate embodiments of an acoustic logging tool.

FIGS. 7A-7C illustrate semblance processing results.

FIGS. 15A-C are semblance plots showing the presence of arrivals from two formation beds.

DETAILED DESCRIPTION

Figure 1:
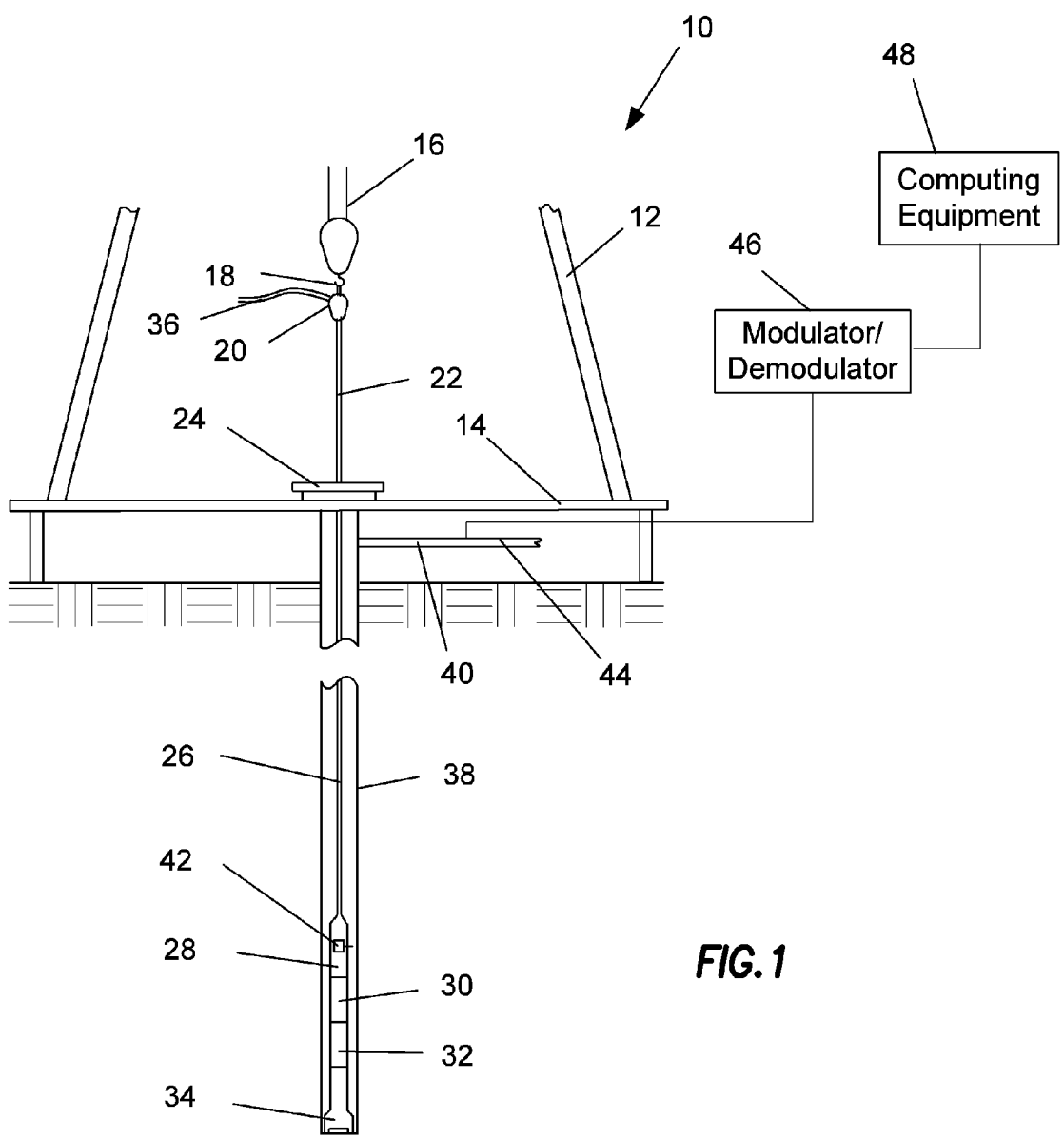
FIG. 1 illustrates one embodiment of a measure-while-drilling ("MWD") or logging-while-drilling ("LWD") environment.

As shown in one embodiment in FIG. 1, a drilling rig 10 (simplified to exclude items not important to this application) comprises a derrick 12, derrick floor 14, draw works 16, hook 18, swivel 20, kelly joint 22, rotary table 24, drillstring 26, drill collars 28, LWD tool 30, LWD acoustic logging tool 32 and drill bit 34. Mud is injected into the swivel by a mud supply line 36. The mud travels through the kelly joint 22, drillstring 26, drill collars 28, and LWD tools 30 and 32 and exits through ports in the drill bit 34. The mud then flows up the borehole 38. A mud return line 40 returns mud from the borehole 38 and circulates it to a mud pit (not shown) and back to the mud supply line 36.

In one embodiment, the data collected by the LWD tools 30 and 32 is returned to the surface for analysis by telemetry transmitted through the drilling mud. In one embodiment, a telemetry transmitter 42 located in a drill collar or in one of the LWD tools collects data from the LWD tools and modulates the data onto a carrier which can be transmitted through the mud. In one embodiment, a telemetry sensor 44 on the surface detects the telemetry and returns it to a demodulator 46. The demodulator 46 demodulates the data and provides it to computing equipment 48 where the data is analyzed to extract useful geological information. Alternatively, in another embodiment, wired drill pipe or wired coiled tubing is used to transport data collected by the LWD tools to the surface. Further, in other embodiments, the tools 30 and 32 are wireline tools that make multiple passes through the borehole or that are equipped with apparatus to cause them to rotate in the wellbore similar to the rotations that an LWD tool experiences.

Referring now to FIG. 2, one embodiment of the drilling system illustrated in FIG. 1 includes an LWD acoustic logging tool 200 with multipole-capable transmitters and multipole-capable receivers capable of generating and sustaining acoustic waves in a geologic formation. In one embodiment, the multipole-capable transmitter consists of two or more transmitters 205 and 210 mounted in a drill collar 215 so that they direct their energy in substantially opposite directions. In one embodiment, the frequency, magnitude and time-of-fire of the energy transmitted by each of the transmitters can be controlled. Consequently, energy transmitted by transmitter 205 can be time-displaced with respect to the energy transmitted by transmitter 210 but with the same frequency and magnitude. The result is a simulated dipole transmitter. In one embodiment, the two transmitters can also be fired synchronously to simulate a monopole transmitter. Further, in one embodiment, the two transmitters can be fired in any combination of frequency, magnitude and timing desired to generate a variety of vibration modes in the formation.

The multipole-capable receiver is constructed, in one embodiment, as two rows of seven spaced receivers 220 mounted in such a way that they are in substantially opposite sides of the drill collar 215. In one embodiment, each receiver has its own data acquisition channel 225 with adjustable gain and signal conditioning characteristics. In one embodiment, each receiver channel is sampled substantially simultaneously and each sample is converted into digital form. In one embodiment, a digital signal processor 230 inside the tool performs calculations using the sampled data. In one embodiment, some or all of the collected data and the calculated data are stored in the tool for analysis and some or all of the collected data and the calculated data is transmitted to the surface through mud telemetry as described above.

In one embodiment, the LWD acoustic logging tool 200 includes a directional sensor/magnetometer 235 or other apparatus that can be used to determine the orientation of the tool.

The approach described above can be used to create tools with monopole, dipole, quadrupole, or any other multipole characteristic by increasing the number of transmitters and the number of receivers. For example, FIG. 3 illustrates a tool with a multipole-capable transmitters and receivers. In one embodiment, the tool includes four transmitters 305 (only three are shown) and four rows of seven receivers 310 (only three rows are shown). In one embodiment, the transmitters and receivers can be manipulated to create a multipole-capable transmitter and receiver set.

In one embodiment, the transmitters transmit acoustic energy which is converted into energy in the formation. In one embodiment, the energy in the formation, which can take a variety of forms including, but not limited to, shear modes, compressional mode, Raleigh modes, and Stoneley modes, reaches the receivers, where it is detected and processed.

In one embodiment, a sonic logging tool is used to acquire data at many azimuths. In one embodiment, a directional sensor/magnetometer in the tool or other method is used to determine the orientation of the tool. In one embodiment, one or more transmitters and one or more receiver arrays are used. The system is not limited to the dual dipole source, 4 receiver array configuration common to industry wireline crossed dipole tools. The source fired could be monopole, dipole, quadrupole, etc. In one embodiment, the waveforms are brute-force measured at each angle. This method eliminates difficulties associated with centering, orientation to the anisotropic direction, hole conditions, receiver matching, etc. In one embodiment, the waveforms are measured directly rather than being calculated.

The fact that the LWD tool signals are affected by low frequency tool modes does not eliminate using dipole sources to determine flexural-wave derived anisotropy—in one embodiment, the higher frequency end of the mode could be used. The velocity varies by anisotropic formation properties.

In one embodiment, the technique described herein detects and measures not only shear, but compressional anisotropy. Using these techniques, a full 3D image of the acoustic properties of the wellbore can be provided.

In one embodiment, azimuthal data can be acquired in at least the following ways:

Focussed Scanning mode: fire 1 source and record at a paired receiver array, and repeating this at multiple azimuths.

Multi-source scanning mode: Fire a multiple source configuration, recording at receiver arrays aligned with the source: e.g. fire a dipole and listen at 2 receiver arrays; fire a quadrupole and listen at 2 or more receiver arrays, etc.

Fire a single source or configuration of multiple sources and record data at aligned and/or unaligned receiver arrays.

Azimuthal sampling can be accomplished in a number of ways, including but not limited to:

Fire at even time intervals, passively tagging the resultant data by azimuth.

Program the tool to acquire data at specific azimuths (azimuthal sectors) for various firing configurations.

In addition, in one embodiment, integrated caliper/standoff data can be used to "correct" data at multiple azimuths so that it can be use to create a position-independent image. For example, if dipole data is taken at multiple azimuths while the tool is rotating, the tool may be in different positions with respect to centralisation (distance from receiver array to bed boundary). Using the stand-off/caliper data the data taken at multiple tool positions can be dispersion corrected so that it can be used to make a coherent image (not dominated by geometry, but by formation properties).

Applications of these methods include geosteering, stress field determination, fracture detection, etc.

The inventors have done modeling and see evidence in field data that good (better) shear anisotropy results can be achieved via these imaging methods compared to traditional cross-dipole techniques.

The Modeling 2D and 3D modelling are very useful for determining design constraints, azimuthal resolution, optimal source configuration and frequency, depth of investigation, dispersion, and anisotropic effects. There are, as always, limits between theoretical modelling and field data, but for purposes of investigating these phenomena, the modelling proves insightful.

Azimuthal Sensitivity

The azimuthal sensitivity of refracted waves has been largely neglected in the past due to 1) the difficulty in acquiring wireline sonic data at multiple azimuths at a single depth and 2) the preference for ring-type monopole sources which produce uniform monopole wave fields. However, with the practicality of acquiring multi-azimuth data with LWD tools, it is of interest to consider the azimuthal sensitivity possible with sonic tools. In order to determine the degree of azimuthal sensitivity, some practical modelling examples are considered.

Case 1: Single Monopole "Point Sources"

Figure 4:
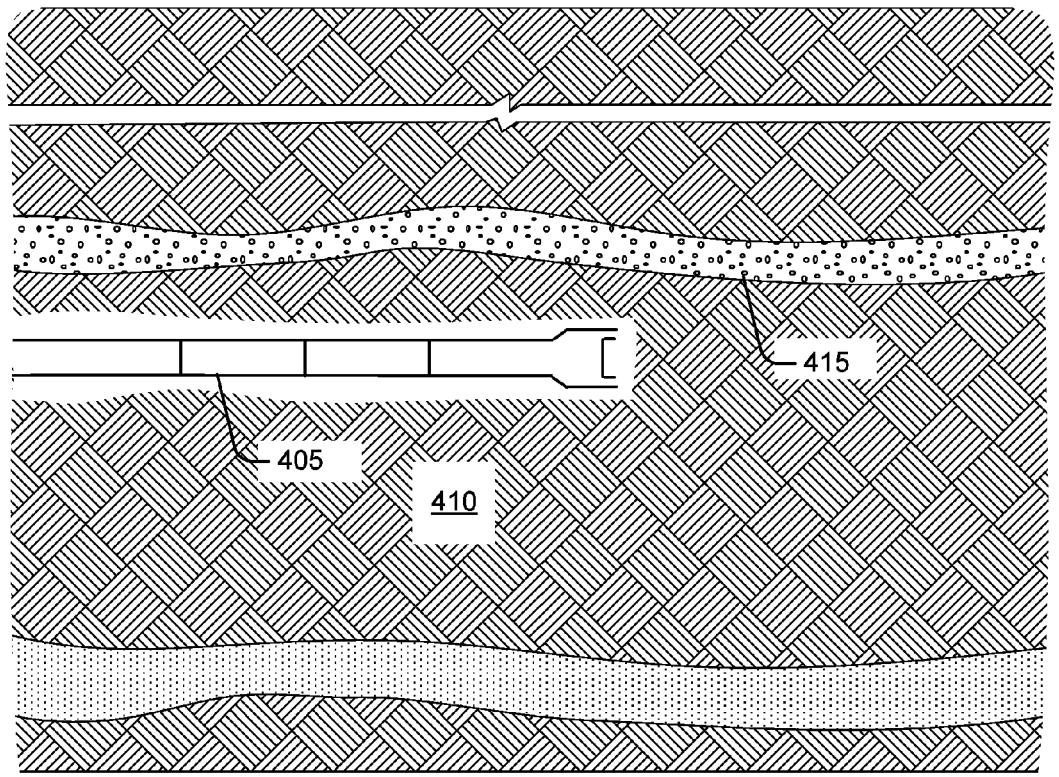
FIGS. 4 and 5 illustrate the environment modeled for several of the examples illustrated in other figures.

The tool 405 considered is a simple 6¾" steel cylinder in an 8½" wellbore (for purposes of azimuthal sensitivity analysis, a simple tool model is sufficient for investigation of refracted modes). The tool is centered and each formation layer considered is isotropic. The tool 405, as shown in FIGS. 4 (showing the tool in plan view in a horizontal section of a well) and 5 (showing a cross section of the tool), resides in a homogenous formation 410 with compressional slowness 80 us/ft. The tool 405 is parallel to a nearby bed 415 with compressional velocity of 57 us/ft located 1 ft away. The beds were chosen with a large impedance contrast for clear illustration.

For purposes of determining the azimuthal sensitivity of this configuration, 16 cases were run successively. In each case, a single monopole transmitter was fired and data gathered at 16 receiver "arrays" spaced 22.85 degrees apart around the circumference of the tool. Each receiver array consists of 11 receivers located 4.5, 5, 5.5, 6, 6.5, 7, 7.5, 8, 8.5, 9, and 9.5 ft, respectively, from the transmitter. Source and receivers are located on the body of the tool. The tool itself is heavily attenuated so that the tool modes do not interfere with the formation arrivals, much as is done mechanically with the field tools.

Figure 6:
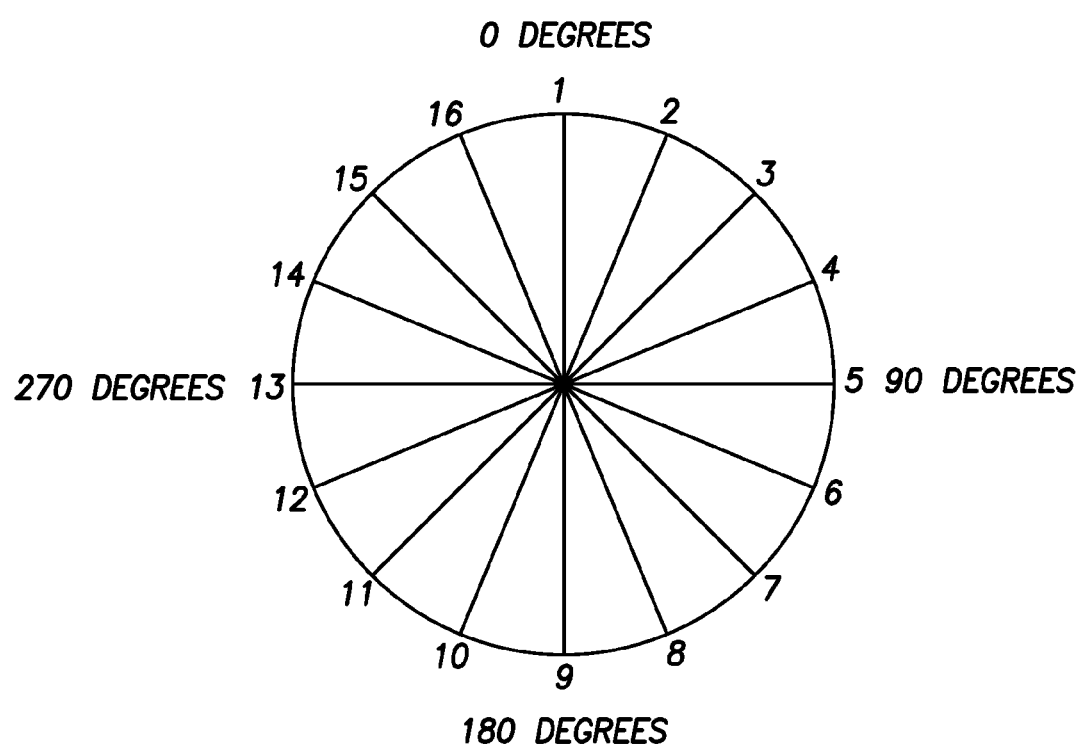
FIG. 6 illustrates one embodiment of the orientation of azimuthal sectors.

Azimuths are taken to be as industry conventions rather than geometrical ones, as shown in FIG. 6. For example, for firing 1, the transmitter was pointed up; for firing 5, the transmitter was pointing right; for firing 9, the transmitter was pointed down; for firing 13, the transmitter was pointed left, etc.

Figure 7C:
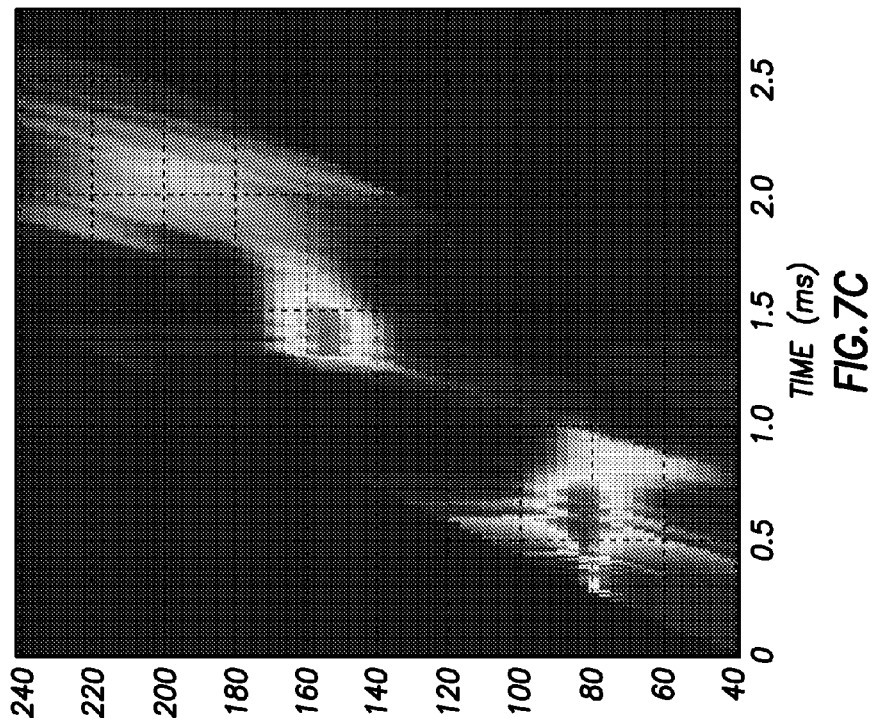

For reference, semblance plots are presented for individual cases in FIG. 7. FIG. 7A shows the semblance results when the tool is in the upper formation, far (20 feet) from the lower bed. The results are from firing transmitter 9 (down) and recording the signal on receiver array 9 (i.e., the receiver "array" pointing in the 9 direction (down)). The compressional and refracted shear arrivals for the upper formation (57 us/ft and 98 us/ft) are clearly visible in the semblance plot. FIG. 7B shows the semblance results from receiver array 1 when the tool is in the lower bed 0.5 feet below the upper bed and transmitter 1 (up) is fired. Compressional waves from both formations are visible (57 us/ft and 80 us/ft) as is the refracted shear for the lower formation (155 us/ft). Finally, FIG. 7C shows the results when the tool is deep into the lower formation (20 feet from the upper bed). The compressional and refracted shear arrivals are clear, at 80 us/ft and 155 us/ft.

In all cases, the distance to the bed boundary is considered, not from the center of the tool, but from the outer edge of the borehole to the formation boundary.

The first case is run with only 1 foot between the tool and the approaching bed in order to allow visualization of the results with semblance plots. As the bed is moved further away, semblance is no longer the best method to detect the two beds and other methods are employed to distinguish the dual arrivals.

In the first case, portions of which are illustrated in FIG. 8, 16 separate models were run. In the first, a single transmitter is fired at position 1, and the resultant waveforms are recorded at all 16 receiver arrays. In the second model, transmitter 2 is fired, and the resultant waveforms are recorded at all 16 receiver arrays, etc. Refer to FIG. 6 for receiver position versus azimuth orientation. Typical oil field azimuth orientation is based on navigational azimuth (0 degrees-360 degrees clockwise) and not classic geometric nomenclature.

Figure 8A:
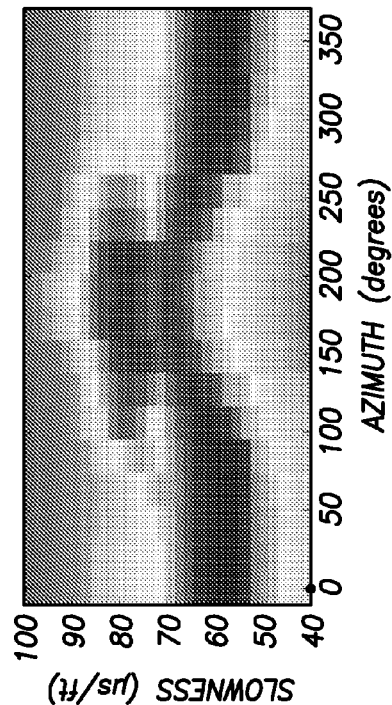
FIGS. 8A-8D illustrate the azimuthal sensitivity of compression waves.
Figure 8B:
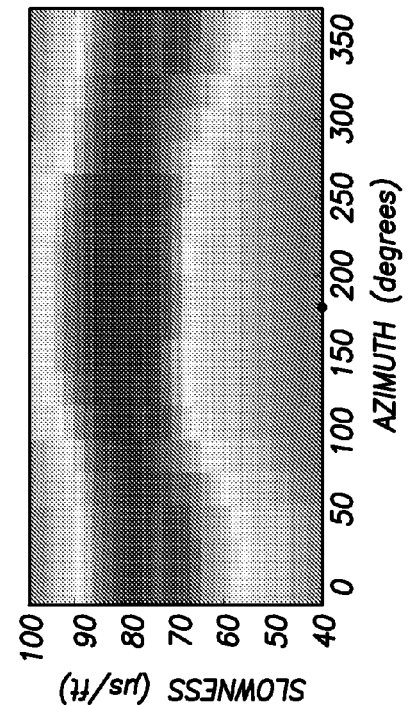

FIG. 8A illustrates the azimuthal results for the first case when the source is fired up (source number 1, whose location is indicated by the black dot on the azimuth axis) at the 16 receiver arrays. The middle of the azimuthal plot (tool looking down) is least sensitive to the nearby formation, as indicated by the weak signal at 57 us/ft. This is because the portion of the tool looking down is furthest away from the nearby bed. The edges (top of the tool) respond most strongly to the approaching formation, as they are closest to the nearby bed.

FIG. 8B again illustrates the azimuthal results at all 16 receiver arrays, but with the source fired down (source number 9, whose location is indicated by the black dot on the azimuth axis). Even though the source is pointed down (away from the approaching bed), the receivers located closest to the bed (i.e., those on the edges) are still somewhat sensitive to the nearby formation, though their velocity is influenced by velocity of the two beds and is not cleanly 57 or 80 us/ft. This is also as expected, as sonic waves are not particles which travel in a discrete line, but rather waves, which are sensitive to the matrix in which they propagate.

Figure 8C:
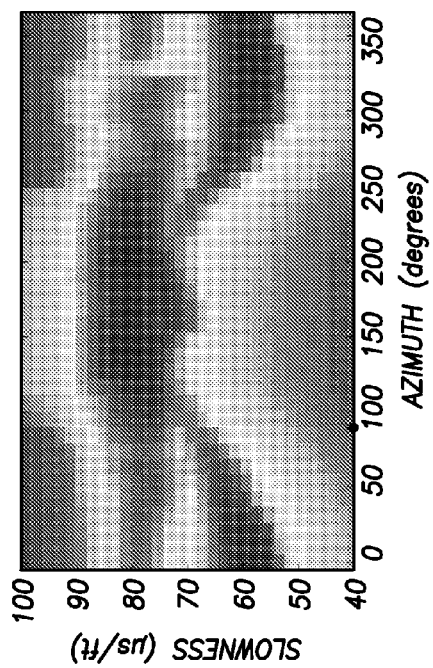
Figure 8D:
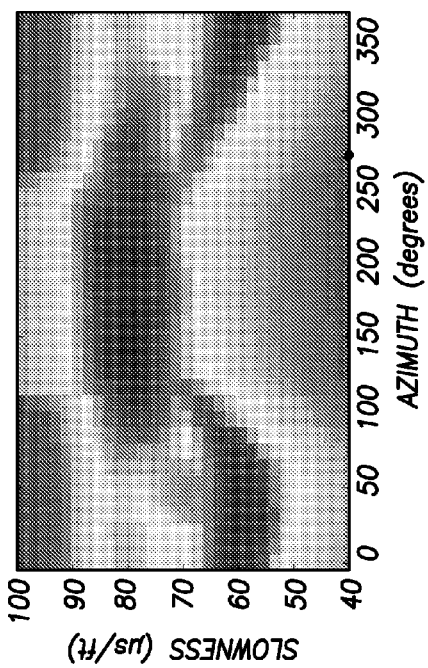

FIG. 8D shows the results from firing the left transmitter (number 13, whose location is indicated by the black dot on the azimuth axis) and listening with all 16 receiver arrays. This plot illustrates an interesting asymmetry effect which is not so surprising after consideration—the upper left receiver arrays are more sensitive to the approaching formation than are the upper right receivers. This is due to the fact that if the upper left source is fired, the upper left receivers will be dominated by the signal in the upper left quadrant, while if the upper left source is fired and the upper right receivers record the data, they are influenced more by the upper right quadrant as well as seeing a weaker signal, as they are further from the source.

Likewise, FIG. 8C shows the results from firing the right (number 5, whose location is indicated by the black dot on the azimuth axis) transmitter, where the upper right receivers are more sensitive to the upper bed than the upper left receivers.

These asymmetric effects led the inventors to consider better ways to acquire azimuthally sensitive data.

Figure 9:
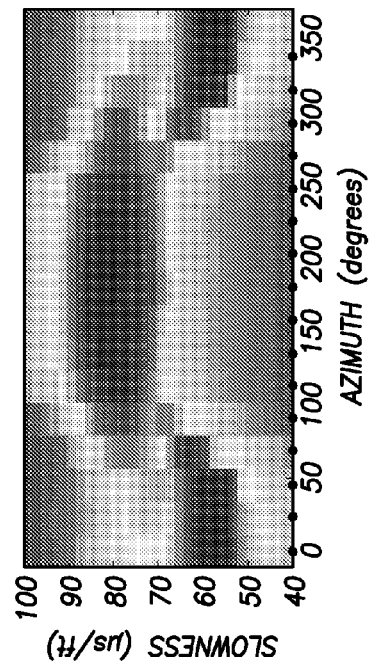
FIG. 9 illustrates firing each source successively and presenting the paired receiver's response at each azimuth.

In FIG. 9, the results are considered only for each azimuthal "pair" of source and aligned receiver array. Thus, at azimuth 0 (straight up), the semblance results from receiver array 1 when transmitter 1 was fired are plotted. At azimuth 22.85 degrees, the semblance results from receiver array 2 when transmitter 2 was fired are plotted, etc. By comparing the results from the paired sources/receivers (FIG. 9) to the single transmitter/azimuthal receiver results (FIG. 8), it can be seen that the resolution is much sharper using the paired source/receiver configuration.

Figure 10:
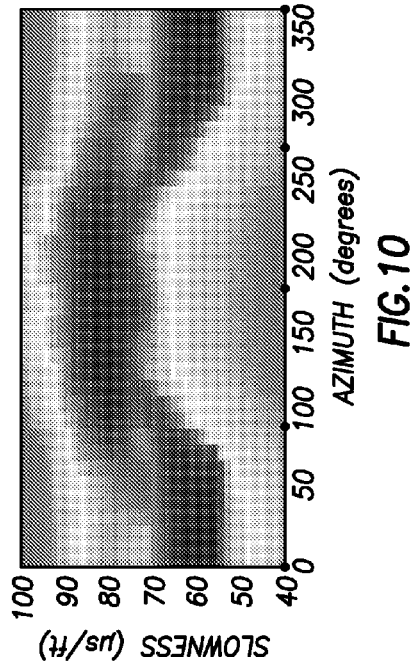
FIG. 10 illustrates firing an acoustic logging tool as a monopole and receiving data on all receivers.

Now consider the sensitivity if 4 sources are fired simultaneously (1, 5, 9, and 13) (producing a monopole) and recording the results at the 16 receiver arrays. FIG. 10 shows the results. Though the sensitivity is reduced compared to the single source/receiver pairs, it is better than firing a single point transmitter and recording at the 16 receiver arrays. The approaching bed and the quadrant in which it lies can still be detected. This is of practical interest, as several industry wireline tools are designed with "ring" monopole sources, but discrete receivers.

Figure 11:
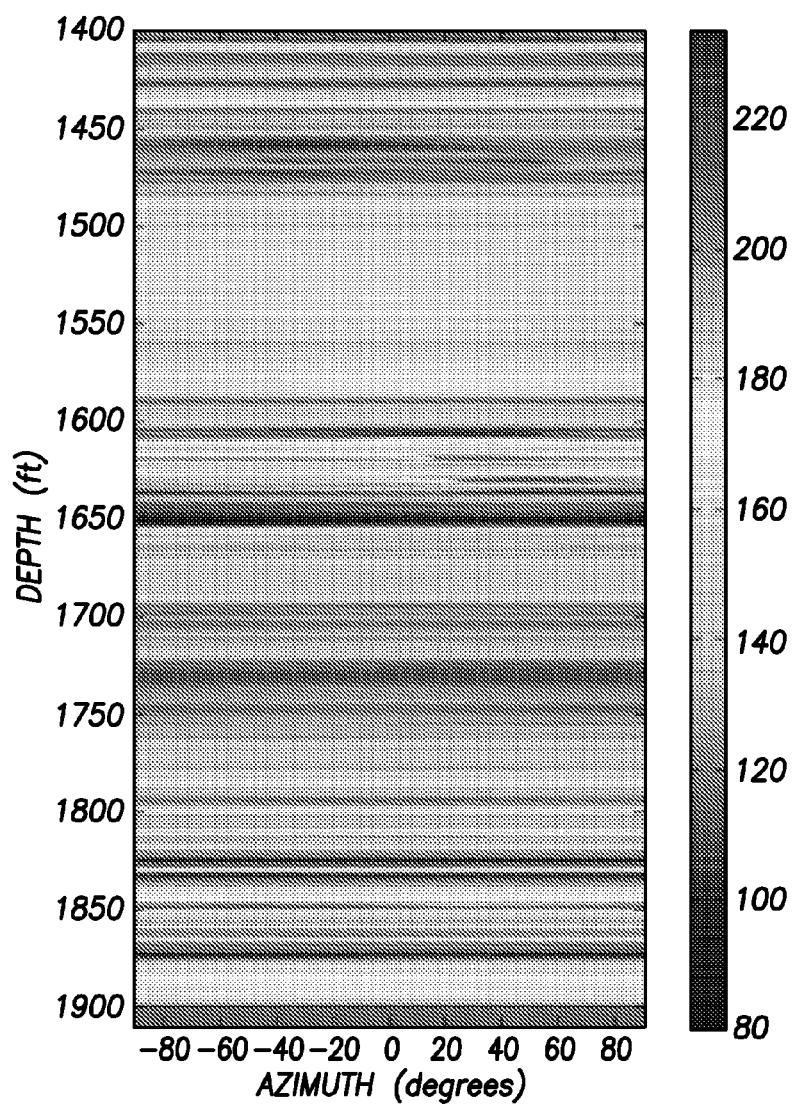
FIG. 11 shows field data from a wireline monopole tool.

FIG. 11 shows Texas carbonate field data from a wireline tool with a monopole "ring" source and 4 discrete receiver arrays. The data was acquired in a fractured formation. Though much of this interval is isotropic, evidence of azimuthal variations can be seen, for example, at 1470 ft, 1620 ft, and 1635 ft. These data were acquired at high azimuthal resolution by making multiple passes in the open hole with the tool oriented differently each time.

What can be seen from these examples is that the compressional wave is azimuthally sensitive. Quadrants are discernable, even with basic semblance processing, and there is even sensitivity variation by (22.85 degree) sectors.

Figure 12:
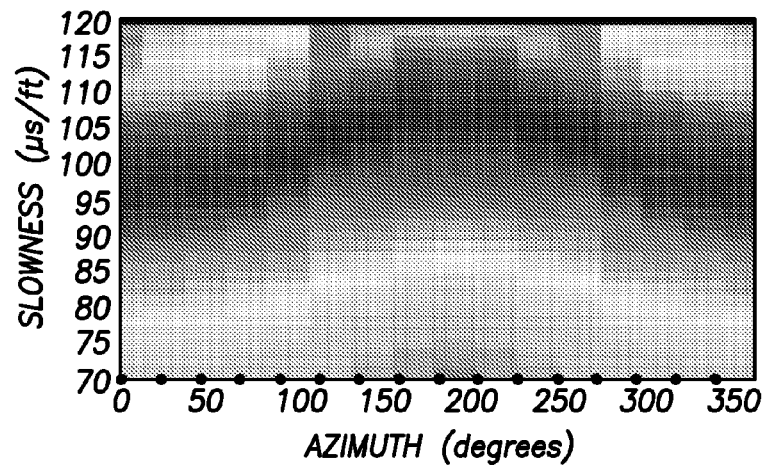
FIG. 12 illustrates the ability to visualize an approaching bed when the tool is embedded in another bed.

In most cases, when the sonic tool is in one formation and close to another, the tool will not be expected to see only the upper formation when looking up and only the lower formation when looking down. At typical compressional logging frequencies, the wavelengths are on the order of 1-3 feet, so it is not unexpected that they will not be tightly focused to a few degrees. As azimuth vs. slowness is plotted, the technique may detect the approaching bed velocity cleanly when pointed directly at it and no effect at all from it when pointed directly opposite the approaching bed (as observed in FIGS. 7-9) but as is often the case, especially if the tool is far from the bed boundary, the influence of the approaching bed may be detected on the observed velocity (slowing or speeding up the velocity around the azimuth). FIG. 12 shows a case where the tool is located in a bed with compressional velocity 112 µs/ft, 1 foot away from a bed with compressional velocity 80 µs/ft. The impedance contrast in this example is not so great as that of FIGS. 7-9, and even though the influence of the approaching bed can be seen by slowing down the velocity on the upper azimuths, a clean 80 µs/ft arrival is not seen. This does not negate the usefulness of geosteering, and in fact simplifies the display. Further, steering engineers are more accustomed to steering with curves such as resistivity, which can be plotted as a single value vs. azimuth (for each depth of investigation, spacing, etc.).

In addition to total wave field considerations, it is also important to note, as mentioned previously, that semblance displays are being used for familiarity, but semblance is not necessarily the best tool for separating multiple arrivals arriving at similar times, which can "tangle up". Seismic deconvolution methods of many varieties can be useful. While long source/receiver spacing can extend the depth of investigation for sonic tools, shorter transmitter to receiver spacing can actually help in the case of azimuthal resolution.

Figure 13B:
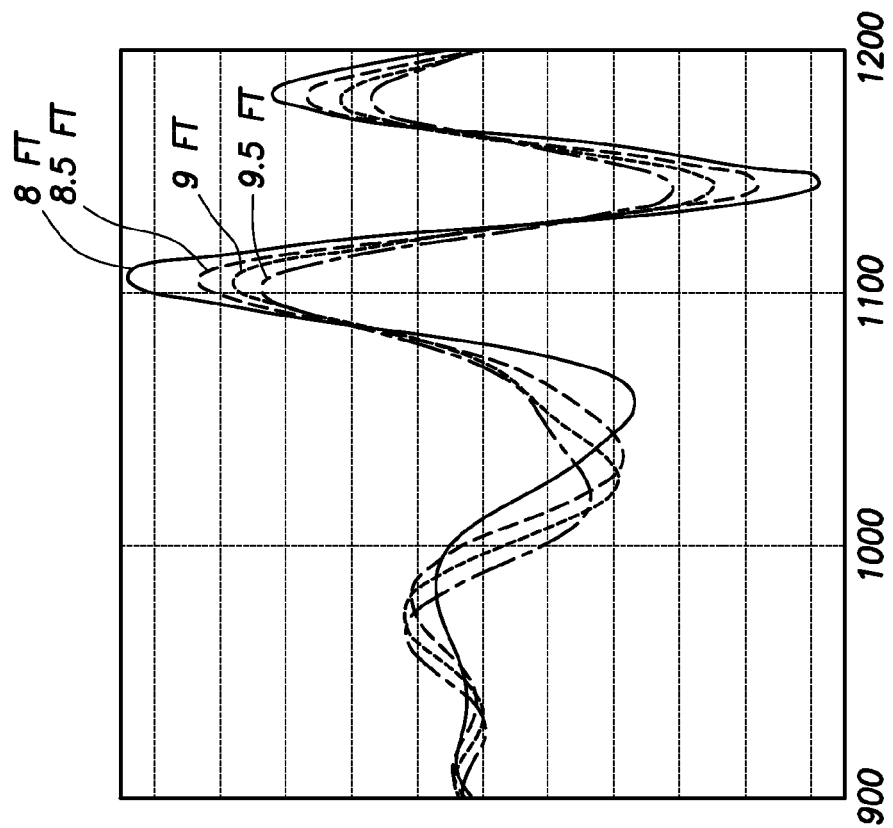
FIGS. 13A and 13B illustrate waveforms resulting from a seismic deconvolution.
Figure 13A:
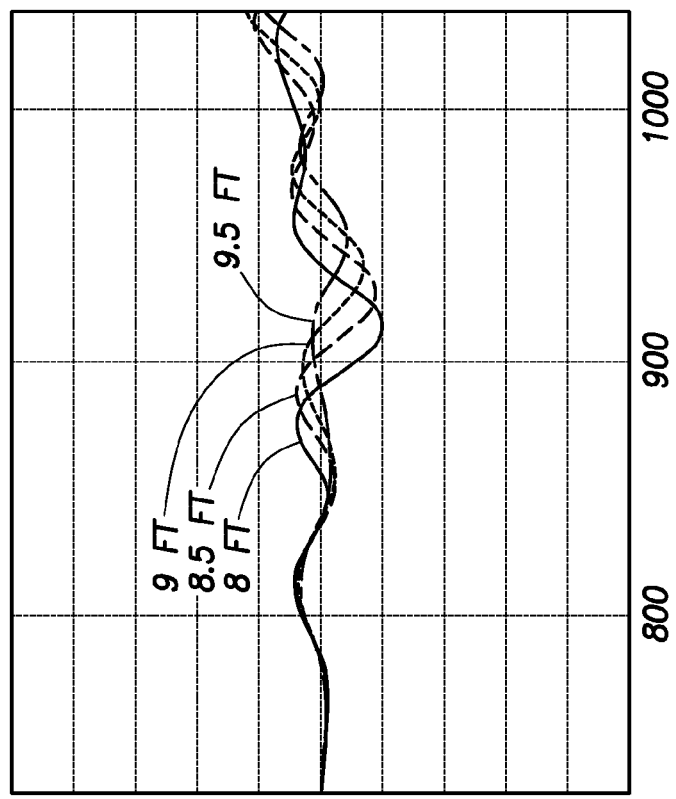

FIGS. 13A and 13B show the waveforms associated with firing 1 (straight up) in the formation described in FIG. 12. Whereas semblance processing has some difficulty in distinguishing two waves arriving at similar times (especially on receivers located closer to the source), we can see from the simple waveform stacking plots that it is possible to separate the two arrivals. In FIG. 13A, which illustrates the results from stacking waveforms using an 80 µs/ft slowness, the arrival peaking at approximately 810 µs in time is the 80 µs/ft arrival. In FIG. 13B, which illustrates the results from stacking waveforms using a 112 µs/ft slowness, the arrival peaking at approximately 1100 µs in time is the 112 µs/ft arrival. Many seismic methods are available to separate competing waveforms which can be applied to this type of data. Downhole processing speed currently favors simple semblance processing schemes, with more advanced signal deconvolution methods computed at surface with full waveform data.

Case 2. The Effects of Frequency on Azimuthal Resolution

Figure 14:
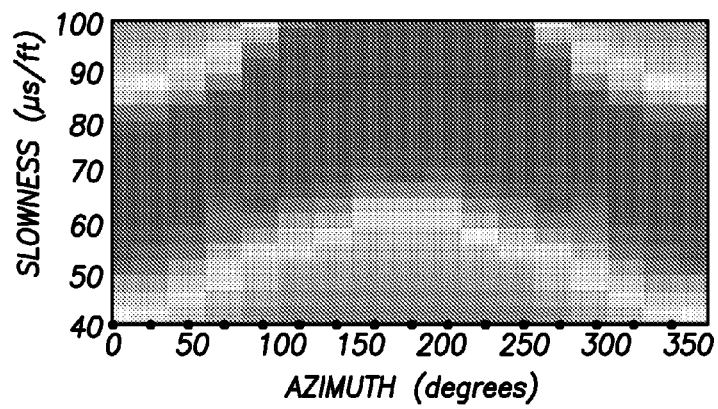
FIG. 14 illustrates the result of firing the array at a lower frequency.

All of the results presented this far were modelled using an 8 kHz source, which has a relatively shallow depth of investigation (less than 3 ft for these formations). Before moving on to considerations of depth of investigation, the azimuthal resolution implication of varying the source frequency is considered. FIG. 14 shows the same results as FIG. 9, with the exception that the sources were fired at 4 kHz instead of 8 kHz. Notice the "blurring" of the azimuthal response. An additional consideration with source frequency is the resonant frequency of the various beds. In general, fast formations have a high resonant frequency while slower formations have lower resonant frequencies. Thus, if the formation in which the tool resides is slower than the approaching bed, as in our example thus far, lower frequencies will favour the slower formation rather than the approaching bed.

When determining the optimal frequency to fire the sources in a logging environment, azimuthal sensitivity, depth of investigation, and formation resonant frequency are balanced according to the desired application.

Case 3: Varying the Distance to Bed

Geosteering is a prime application for azimuthal imaging. For useful geosteering, both azimuthal sensitivity and deep depth of investigation are useful to detect the approach of a nearby bed as early as possible.

Figure 15C:
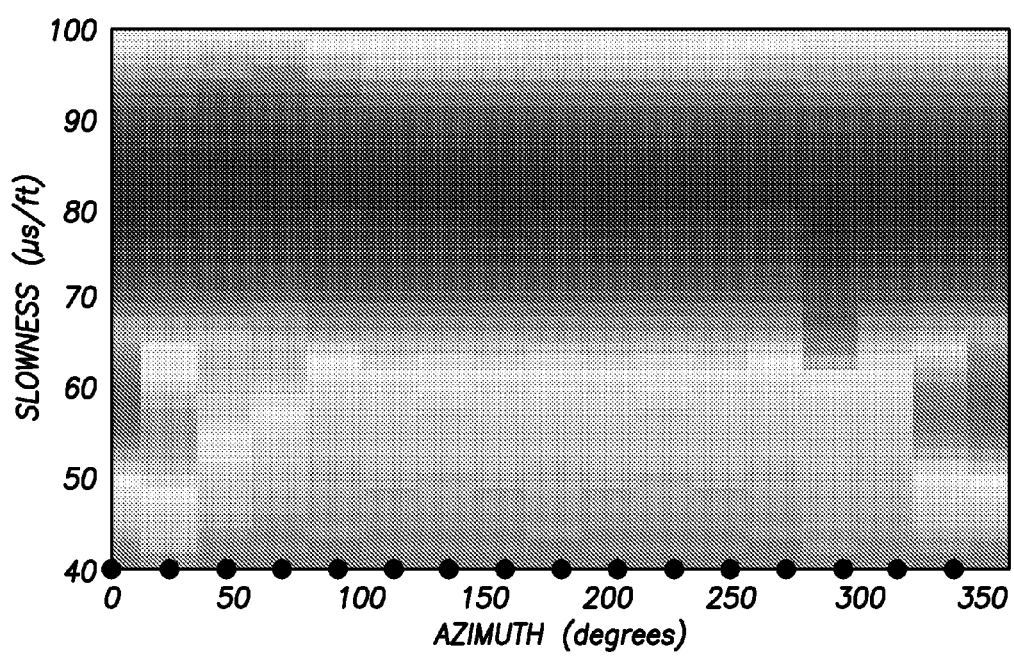

As a general rule, lower frequency waves penetrate deeper, and thus in simple terms, it might be expected that if the source is fired at low frequency, an approaching formation will be seen from further away. However, as just seen in the case above, the resonant frequency of the multiple beds must be considered when determining depth of investigation. It may also no longer be suitable at this point to rely on semblance plots to detect multiple beds at far distances. Return to the first formation, where the tool resides in an 80 µs/ft formation with a 57 µs/ft bed above. FIG. 15A is a semblance plot from the transmitter/receiver pair at azimuthal position 1 (both looking straight up, looking at toward the approaching 57 µs/ft bed). At 1 foot away, it is possible to see semblance responses from the lower bed (80 µs/ft ) as well as the upper bed (57 µs/ft). In FIG. 15B, the tool is located 2 ft away from the upper bed, and though arrivals associated with both formations can still be seen, arrivals from the upper bed now appear later, as the waves had to travel further from the tool to the bed boundary, and the semblance is weaker. FIG. 15C is a semblance-based azimuthal slowness plot like the ones shown in previous plots. It can be seen that when the tool is further from the formation the transmitter should be pointed in the direction of the approaching bed, i.e., toward the upper quadrant in the example in FIGS. 15A-C, to detect the approaching bed with semblance methods.

Figure 16A:
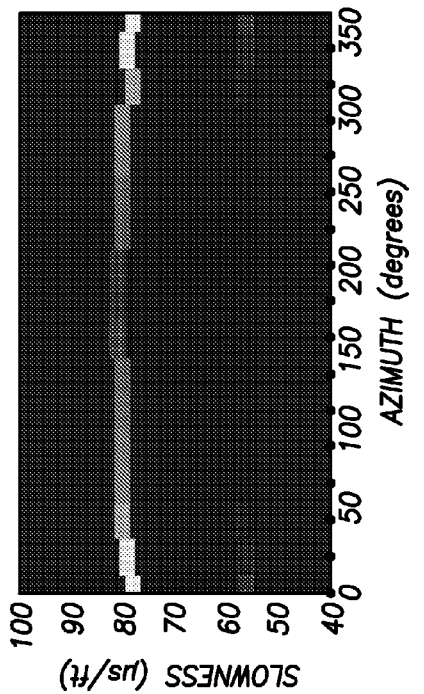
FIGS. 16A-D compare a semblance plot with energy peak plots.
Figure 16B:
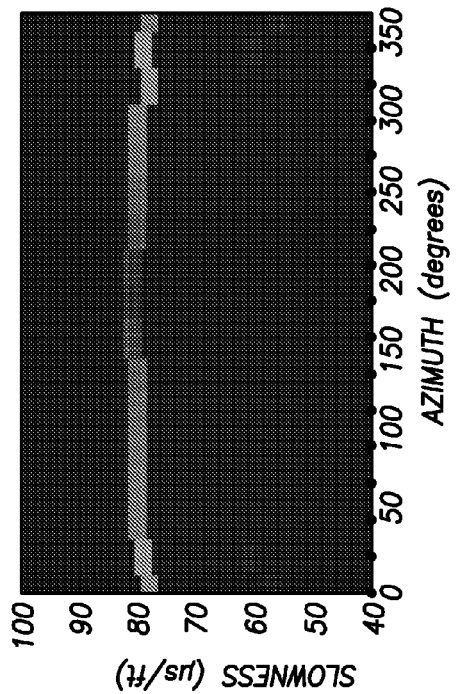
Figure 16C:
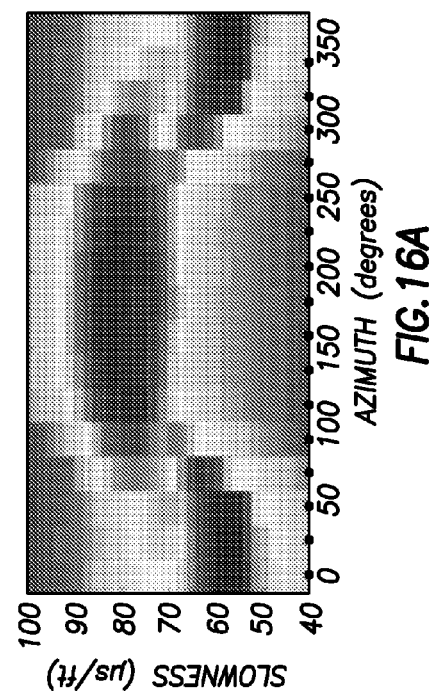
Figure 16D:
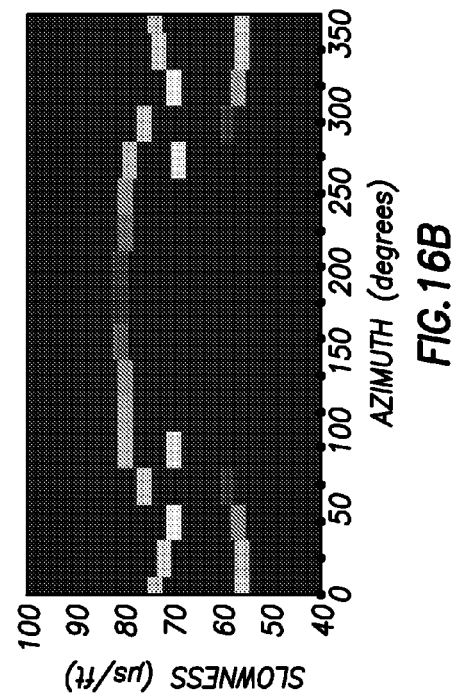

However, if the technique employs a peak-matching method (i.e., one of various methods for aligning waveforms along the receiver array either visually or automatically such as is shown in FIG. 13), which is better at resolving overlapping and weak arrivals, a plot of azimuth vs. slowness can be presented, with the darkness of each arrival indicating its relative amplitude (energy), arrival time, or frequency of the multiple peaks. FIG. 16 shows a comparison between the semblance display (16A) and an energy-coded peak plot (16B). FIGS. 16C and 16D show similar energy plots when the approaching bed is 2 and 3 feet away, respectively.

Figure 16E:
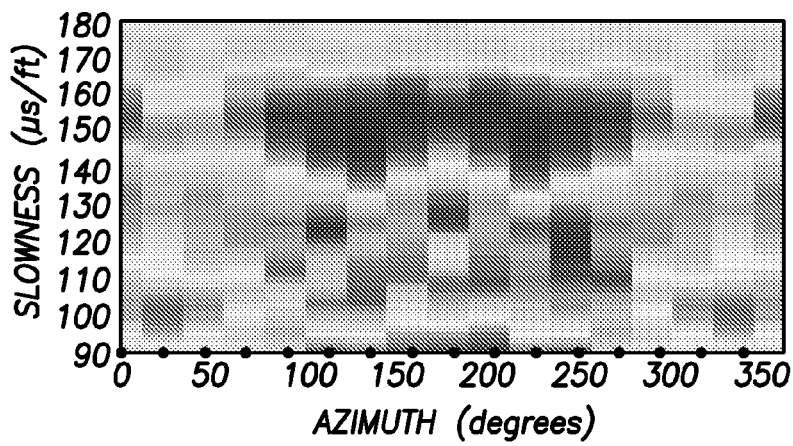
FIG. 16E illustrates compressional and refracted shear responses from an approaching bed.

Refracted shear can also be used to create azimuthal image plots (if both formations have shear velocities faster than fluid). In FIG. 16E, the tool is located in a formation with shear slowness 155 µs/ft approaching and one foot away from a bed with shear slowness of 98 µs/ft. FIG. 16E shows both compressional and refracted shear response in the 80 µs/ft formation approaching a 57 µs/ft formation.

Case 4: Influence of Velocity Contrast on Resolution

There are many aspects of sonic azimuthal imaging that have parallels to resistivity imaging. In particular, the depth of investigation of both tools is influenced by the contrast of the beds. For example, with resistivity imaging tools, a low resistivity bed can be detecting from a high resistivity bed from further away than a high resistivity bed from a low resistivity bed.

Figure 17:
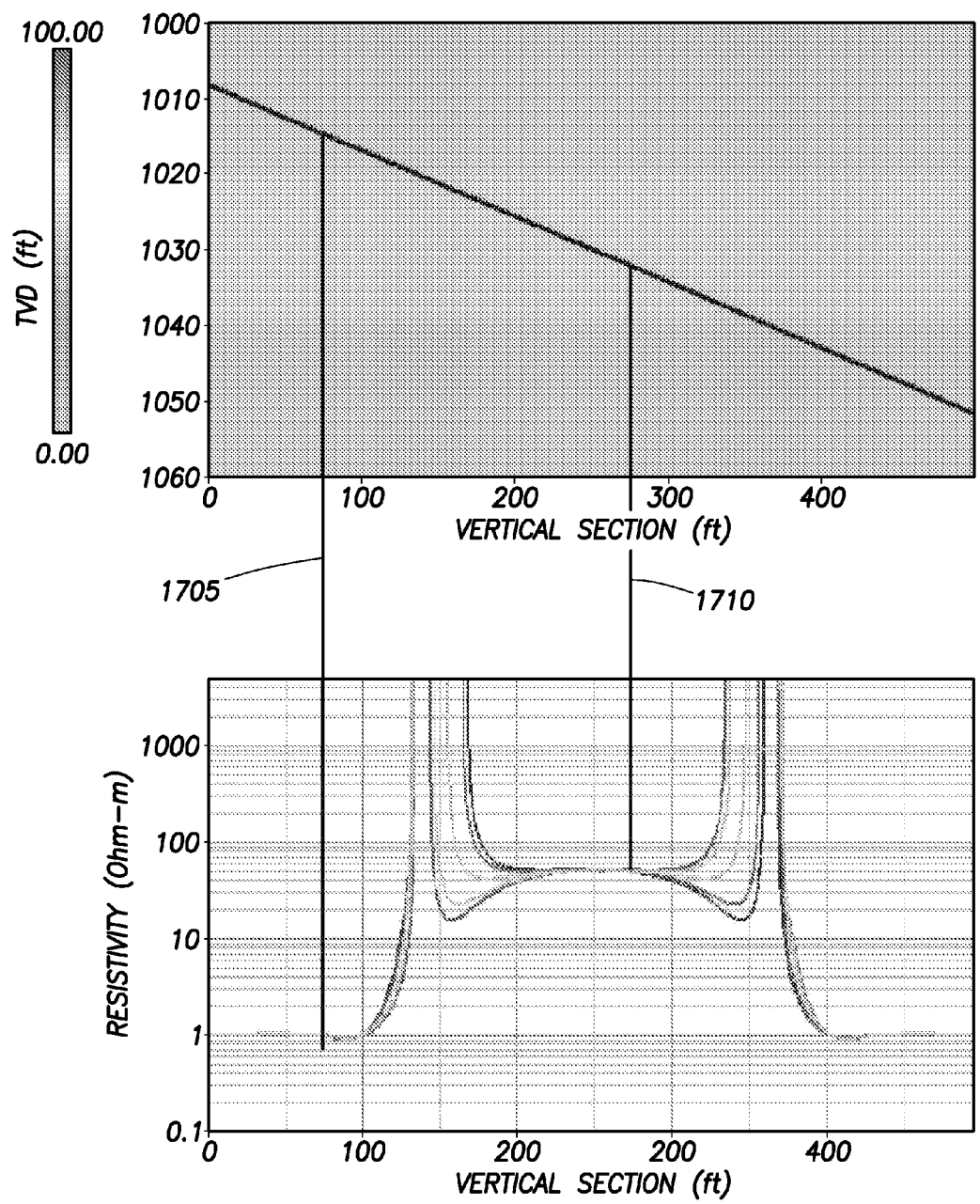
FIG. 17 illustrates that resistivity bed detection is influenced by resistivity contrast.

The top graph in FIG. 17 illustrates a model of a three layer sequence. The top layer (above about 1020 ft) is 1 ohm-meters, the middle layer (between about 1020 and 1040 feet) is 50 meters, and the bottom layer (below about 1040 feet) is again 1 meters. The bottom graph in FIG. 17 shows resistivity as a function of vertical section. When the tool is in the upper low resistivity bed, the middle layer (high resistivity) can be detected from approximately 5 ft away (TVD), as indicated by line 1705. When the tool is in the middle (high resistivity) bed, the low resistivity bed can be detected from approximately 8.5 ft away, as indicated by line 1710.

Figure 18A:
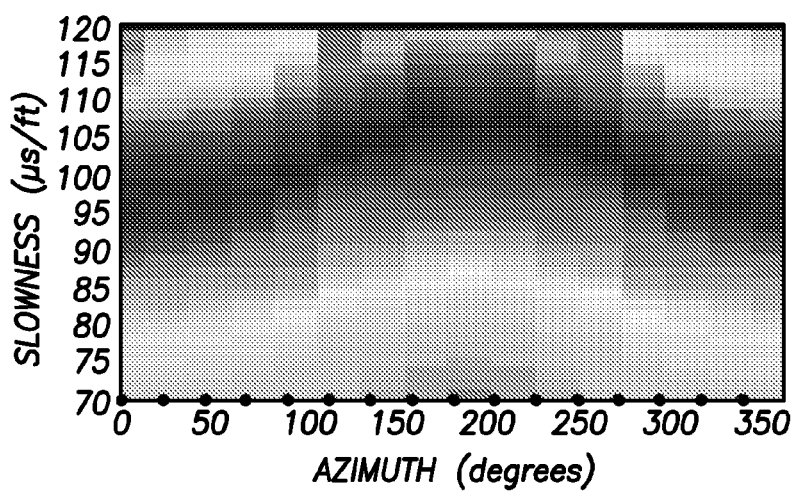
FIGS. 18A and 18B illustrate that sonic bed detection is influenced by velocity contrast.
Figure 18B:
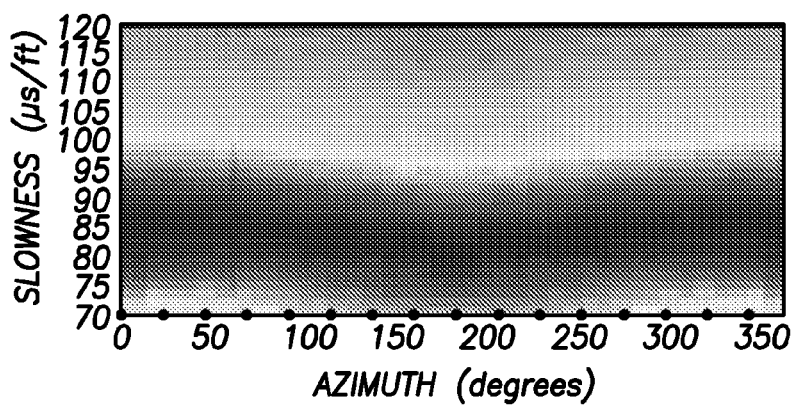

The sonic parallel case is that the depth of investigation (and azimuthal sensitivity) is greater when the tool is in a slow formation approaching a fast one than when it is in a fast formation approaching a slow one. FIG. 18 illustrates this phenomenon. FIG. 18A illustrates the azimuthal sensitivity when the tool is in a 112 µs/ft formation approaching an 80 µs/ft bed. FIG. 18B shows the opposite—the tool is in an 80 µs/ft bed approaching a 112 µs/ft bed. In both FIG. 18A and FIG. 18B the results are from paired sources and receivers. The azimuthal sensitivity is greater in the first case, as is the depth of investigation (not shown).

In either case, the ability to detect an approaching formation while in another formation is useful in the geosteering context. For example, if it is desired to enter the approaching formation the tool can be steered toward the approaching formation or it can be kept on the current course which appears to be taking it into the approaching formation. Similarly, if it is desired to avoid the approaching formation or to stay in the current formation, the tool can be steered to achieve that aim.

Case 5: Anisotropy

Geosteering is only one application of sonic imaging technology. Another area where the technology may be used is in measuring anisotropy—either intrinsic or stress-induced. Anisotropy can be useful, for example, in determining where a formation should be fractured. Anisotropy analysis is the form of azimuthal sonic analysis which is most commonly performed today in the form of shear anisotropy analysis. Historically, only wireline crossed-dipole tools have provided a shear anisotropy measurement, as early LWD monopole, single-axis dipole, and quadrupole tools were initially considered unsuitable for anisotropy measurements in the traditional manner. Multi-azimuth sampling gives additional options for anisotropy determination, particularly in the often off-centred LWD environment.

As detailed reviews of crossed-dipole anisotropy measurements are available from a number of sources only a simplified review is in order for those readers not familiar with crossed-dipole anisotropy analysis.

Figure 19:
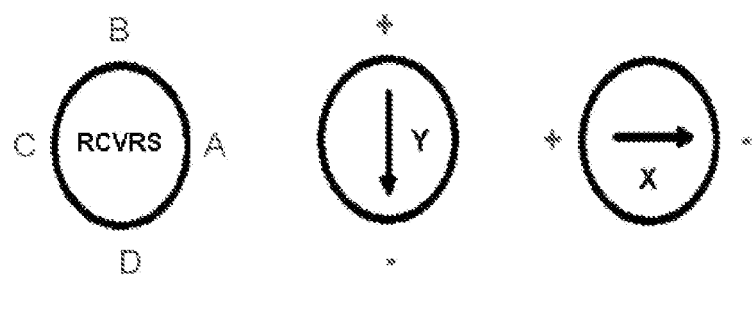
FIG. 19 illustrates a crossed dipole source and receiver configuration.

Crossed-dipole (wireline) acoustic tools, illustrated in FIG. 19, use a pair of orthogonal acoustic sources ("+" and "−" in the Y axis and "+" and "−" in the X axis) to create acoustic surface waves on the borehole wall. These surface waves (flexural waves) are strongly influenced by the mechanical stresses in the formations surrounding the borehole as well as any intrinsic anisotropy (such as fine layering in shales). This velocity anisotropy is detectable by receivers (e.g., receivers A, B, C, and D in FIG. 19) in the dipole tool and can be used to map the stress field anisotropy itself. Fractures, whether natural or drilling induced, tend to distort the shear wave velocity field in the measuring volume of the dipole tool, generally enhancing the magnitude of measured anisotropy.

In simple terms, crossed-dipole tools determine anisotropy in the following manner:

1) The x-axis dipole source(s) are fired, and the waveforms are recorded at the x-axis receivers (e.g. A and B in FIG. 19) and y-axis receivers (e.g., B and D in FIG. 19). These waveforms are denoted as XX and XY. The first letter denotes the source axis; the second letter denotes the receiver axis.
2) The y-axis dipole source(s) are fired, and the waveforms are recorded at the y- and x-axis receivers. These waveforms are denoted as YY and YX.
3) Using orthorhombic relationships (Alford rotation), the waveforms at every azimuth can be calculated by:

$$w(\theta)=\cos^2(\theta)XX+\cos(\theta)\sin(\theta)[XY+YX]+\sin^2(\theta)YY \quad (1)$$

where θ is the angle with respect to the X axis.

Figure 20:
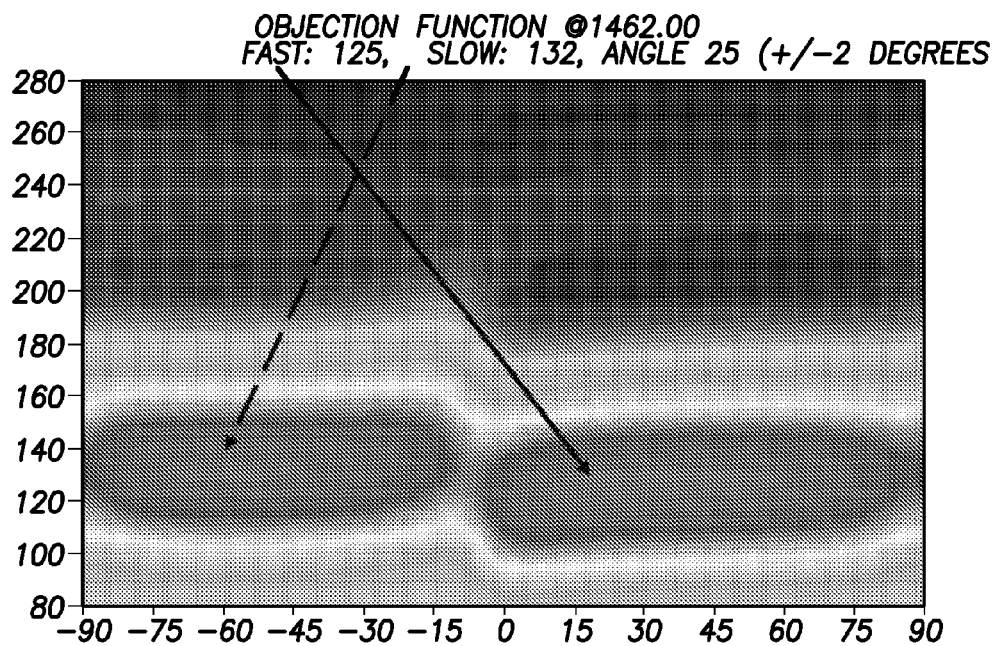
FIG. 20 illustrates slowness versus azimuth, computed via an objective function.

4) This calculation produces a set of waveforms at each azimuth from which it is possible to compute semblance at each azimuth, identify the dominant peak (slowness) and plot azimuth vs. slowness as in FIG. 20. The plot in FIG. 20 is azimuthally referenced to the tool coordinate system.

It should be noted that these calculations have been done in the coordinate frame of reference of the tool position. To determine the absolute direction of the anisotropy, the tool azimuthal position should be accounted for. For example, if we consider the azimuthal system in FIG. 6, and a dipole source was fired in position 6, in order to determine the absolute angle of anisotropy, we would subtract 22.5 degrees from the calculated angle of anisotropy.

It is then possible to determine the fast shear slowness, slow shear slowness, and the angle of the anisotropy direction. Admittedly, this is a simplified explanation of crossed-dipole anisotropy methods, as there are better ways that are known in the art to get from raw azimuthal waveforms to FIG. 20 than computing semblance at all azimuths.

In order for the above methods to work, it is assumed that the tool is well centralized in a circular wellbore, and that the sources and receiver arrays are matched in amplitude and frequency response. In practice, this adds uncertainty to the measurement up to a point, at which it becomes unreliable to perform the calculation at all.

If the sources or the receivers within the same ring around the wellbore are not well matched in amplitude, it can be seen that equation 1 would be affected in multiple ways. First, since XX, YY, XY, and YX are normally computed by subtracting the waveforms acquired at opposing receiver arrays (e.g. XX=XA−XC) in order to enhance out-of-phase flexural waves and suppress in-phase Stoneley waves, any mismatch in the amplitudes of the opposing sources or the opposing receivers will distort the resultant waveform (though it is possible to make the orthorhombic calculations using the results from individual receiver arrays without subtracting them, so long as one can distinguish flexural from Stoneley, etc.). In addition, the calculation—which assumes normalised amplitudes from each of the input waveforms—will be skewed. However, it is possible to "match" the sources and receivers via processing before the orthorhombic calculation with good results.

Figure 21:
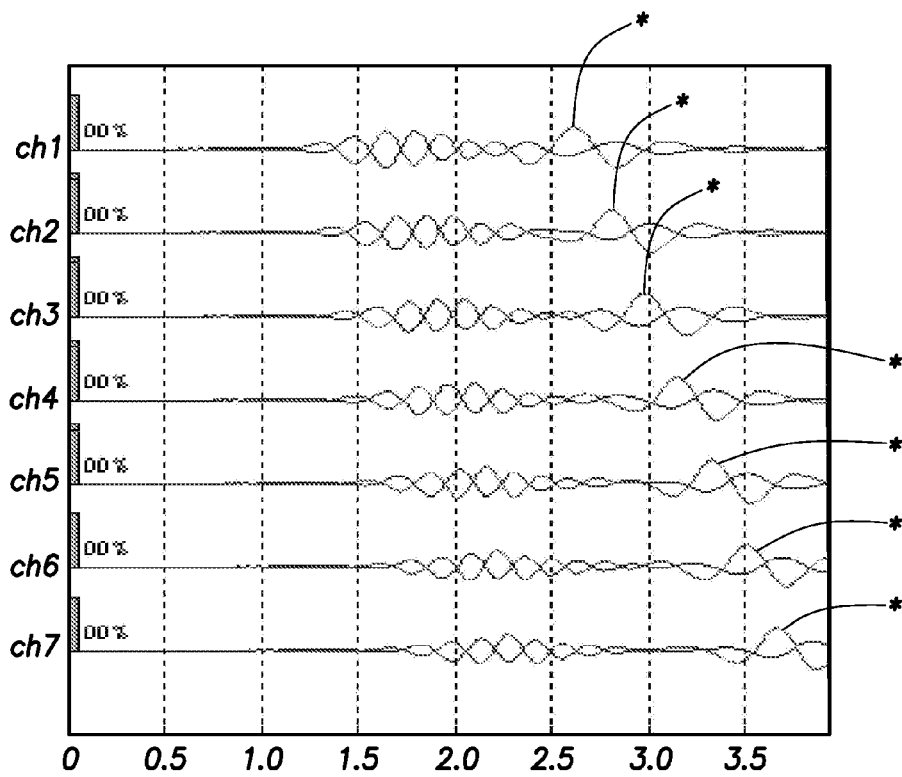
FIG. 21 shows waveforms from the XA and XC receivers of a wireline tool off-centered 1 inch in a wellbore.

If the tool is off-centered or if the borehole is irregular in shape (egg-shaped, for example), it is not a simple matter to try to "correct" the waveforms back to a centralised, circular scenario. This is because, not only is there an increased travel time for the waves on the side furthest from the borehole wall and a decreased travel time for the receivers located closer to the borehole wall (which possibly can be accounted for if the tool position and hole shape are well known), but the borehole modes, which are dispersive waves, change character depending upon the position of the tool. For example, FIG. 21 illustrates waveforms from the XA and XC receivers of a 3⅝" wireline tool off centered 1 inch in an 8.5" wellbore. The starred waveforms in each pair are from the side of the tool closest to the borehole wall while the other waveforms in each pair are from the side furthest from the wall. Stoneley waves, for example, may mix with the flexural waves differently on each receiver array. Off-centering also affects the dispersion curves, particularly if the annulus is small.

While not impossible to "correct" the waveforms in imbalanced, off-centered, or irregular hole cases, it can be difficult and lead to large uncertainty. Another option is to make multiple discrete measurements around the wellbore as discussed earlier. Discrete dipole measurements can be made as well as the single point source/receiver pair and monopole source methods previously described, such that the flexural wave can be measured at multiple azimuthal points. Imbalanced sources/receivers, eccentering, and irregular hole shapes have much less effect using this method, as there are no calculations needed which require matched waveforms from multiple azimuths, but rather the flexural mode can be measured at each azimuth, and each measurement can be corrected for the tool position and hole size affecting the receiver array at each azimuth independently. When it is considered that it is not even necessary to combine opposing receiver arrays, this makes anisotropy measurements possible even in off-centered LWD cases in poor hole conditions, assuming that the tool position and hole shape are known.

For example, LWD dipole measurements are commonly used to determine slower-than-fluid shear. A dispersion correction is made to derive the shear velocity from the flexural slowness. This dispersion correction depends on the mud speed, mud weight, compressional velocity and formation density. The uncertainty in the dispersion correction is less if the input parameters are well known. If there are calipers integrated into each azimuthal receiver array, the uncertainty due to hole size is almost nil. The remaining uncertainty is dominated by the mud speed, which will affect all azimuthal measurements at the same depth similarly. Thus, even if there is a 2% uncertainty in the flexural-derived shear slowness due to the mud speed, it will exhibit itself as nearly the same offset value at all azimuths, meaning that the difference between the fast and slow shear slownesses and the angle of anisotropy would be accurate, even if the absolute value of each shear slowness had uncertainty due to mud properties.

While crossed-dipole measurements are still an excellent way of determining anisotropy in centralized cases with balance sources/receivers and regular boreholes, multi-azimuth anisotropy measurements have a better chance of yielding good quality anisotropy measurements in off-centered, irregular boreholes, and many LWD environments.

Figure 22:
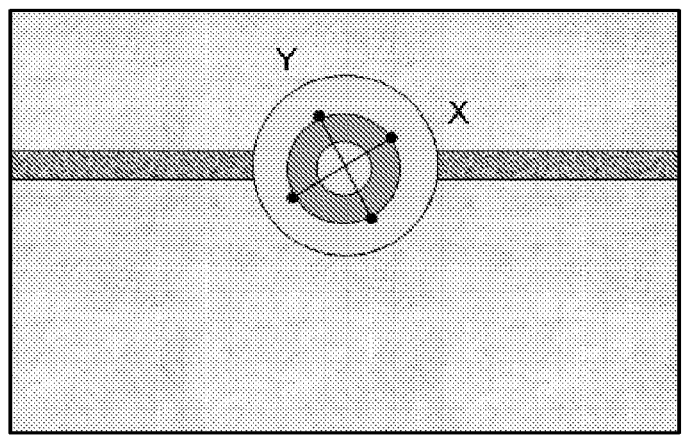
FIG. 22 shows an LWD anisotropy model diagram.
Figure 23:
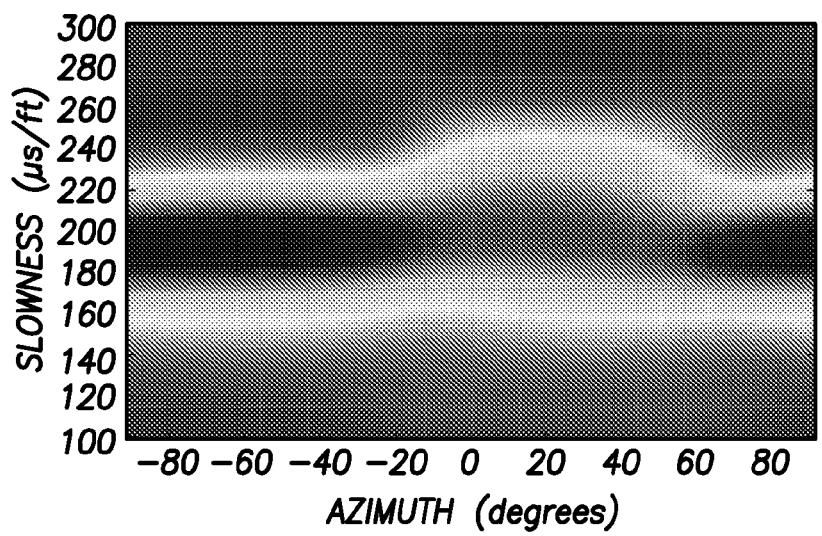
FIG. 23 shows an example of anisotropy.

A simple example of LWD crossed-dipole anisotropy is shown in FIG. 22, which illustrates the formation and tool position. The tool shown in FIG. 22 is rotated 22.5 degrees counter-clockwise of the slow shear direction for the measurement. The anisotropy is in a very simple format—there is a slower velocity zone 2 inches wide in the middle of a homogeneous formation (this is a simple way to model a weak stress field). The tool is centralised and fired as a crossed-dipole. The flexural mode slowness in the background formation is 190 µs/ft and the flexural mode slowness in the slow intrusion is 205 µs/ft. The fast anisotropy direction is 22.5 degrees with respect to the tool position. FIG. 23 shows the results from using the crossed-dipole data to compute the anisotropic wave field. The calculated results were: fast=191 µs/ft, slow=205 µs/ft, slow shear direction=24 degrees—i.e. in the coordinate system of the tool, the slow shear direction was 24 degrees southeast of the x direction, which is very close to the input model (22.5 degrees).

Data Displays

Figure 24:
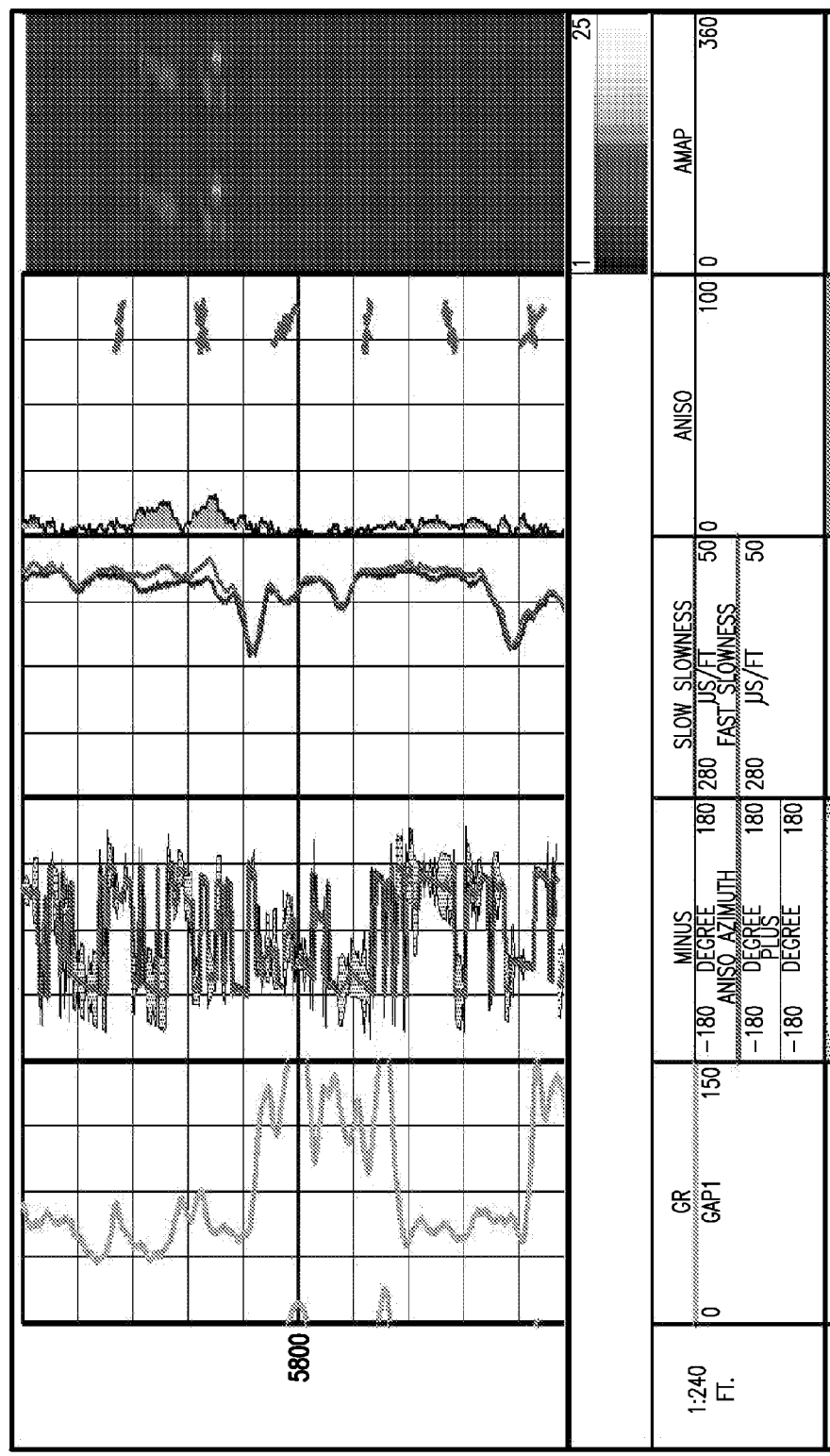
FIG. 24 illustrates a prior art sonic anisotropy display.

As is evident when displaying modelling results, there are considerable quantities of information generated by azimuthal multi-frequency sonic tools. Displays of sonic anisotropy are conventional as shown in FIG. 24, which shows a Flexural Slowness Anisotropy Analysis. Track 1 records the gamma ray of the logged interval. Track 2 records the orientation, relative to magnetic north, of the stress field. The azimuth is recorded from south (left margin) to north (center track) to south (right track). Track 3 records fast (maximum) and slow (minimum) flexural wave slowness. Track 4 records the percent of anisotropy (based on the fast and slow values). Track 5 is a map of the anisotropy as a function of azimuth angle.

New visualisation methods are useful for such applications as geosteering, and for data processing and QC for rotational tools acquiring data at many azimuths (possibly irregularly spaced azimuths).

Figure 25:
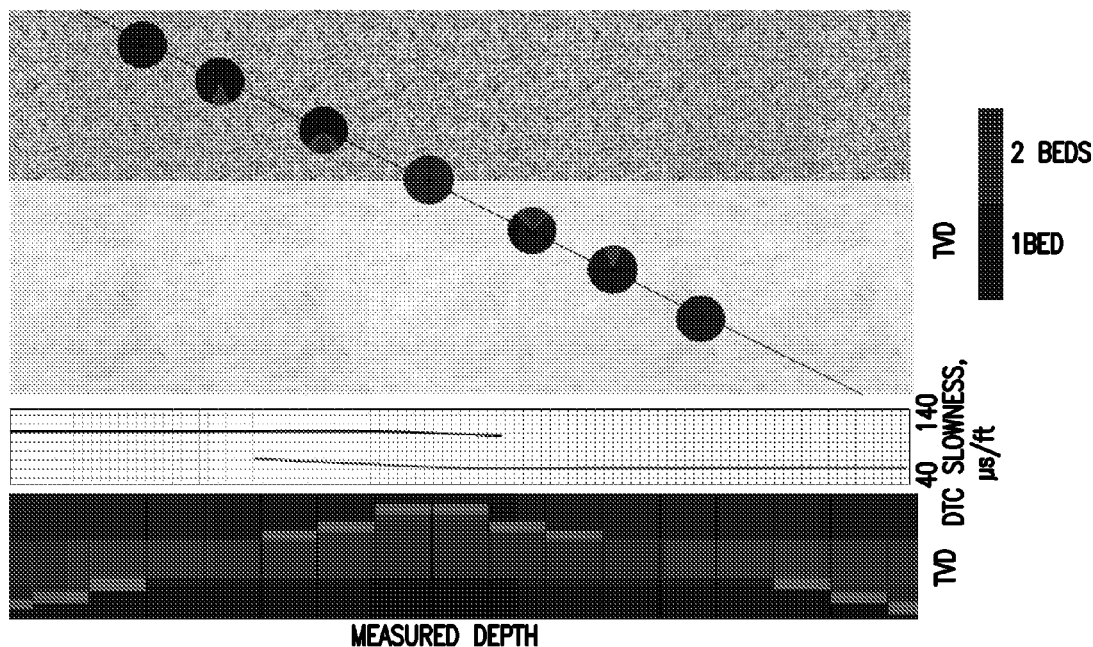
FIG. 25 illustrates an embodiment of a geosteering display.

FIG. 25 shows one embodiment of a geosteering display, which indicates, at each depth, how many different arrivals are present at each azimuth (this could be presented for compressional or shear). An accompanying curve then indicates (by measured depth) the velocities of the multiple arrivals. FIG. 25 illustrates a simple example where the tool is passing from a thick 120 µs/ft formation to a thick 60 µs/ft formation, but this display can be extended to cover more than two beds.

Figure 26:
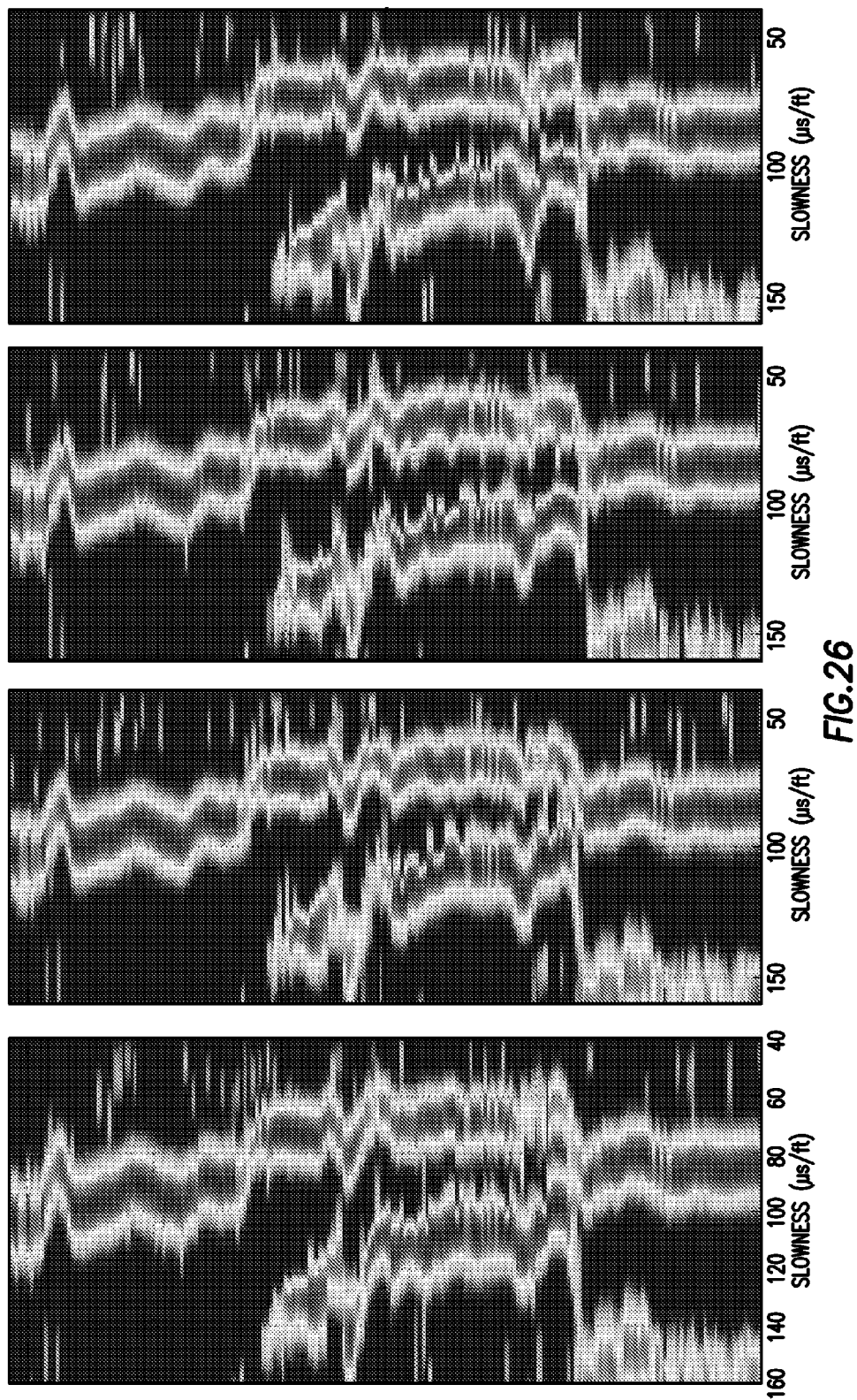
FIG. 26 illustrates one embodiment of a quality control plot.

In addition to simplified geosteering displays, quality control plots are also helpful. FIG. 26 shows an example of data sorted by quadrant, then presented as a semblance VDL for each quadrant. The data were acquired while the tool was rotating, them resorted such that the leftmost plot shows data acquired between 0 and 90 degrees, the second from left plot shows data acquired from 91-180 degrees, the third plot shows data acquired from 91-270 degrees, and the right plot shows data acquired from 271-360 degrees. There is no stacking of waveforms within the bins—each depth represents a single waveform only (in this case, only waveform data was acquired in each bin as the rotation rate was controlled). An even more basic plot (not shown) would be to display the semblance results for each receiver array as acquired (not sorted by azimuth) to validate the quality of the individual receivers and sources.

Field Data

Figure 27:
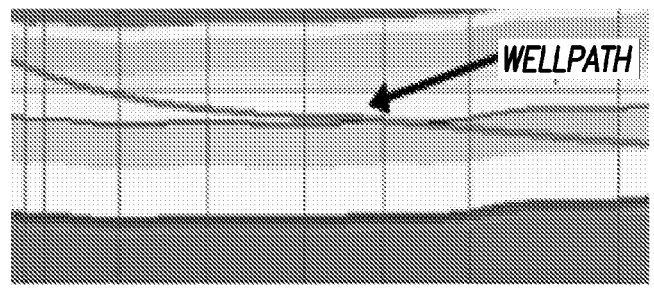
FIG. 27 shows a well trajectory.
Figure 28A:
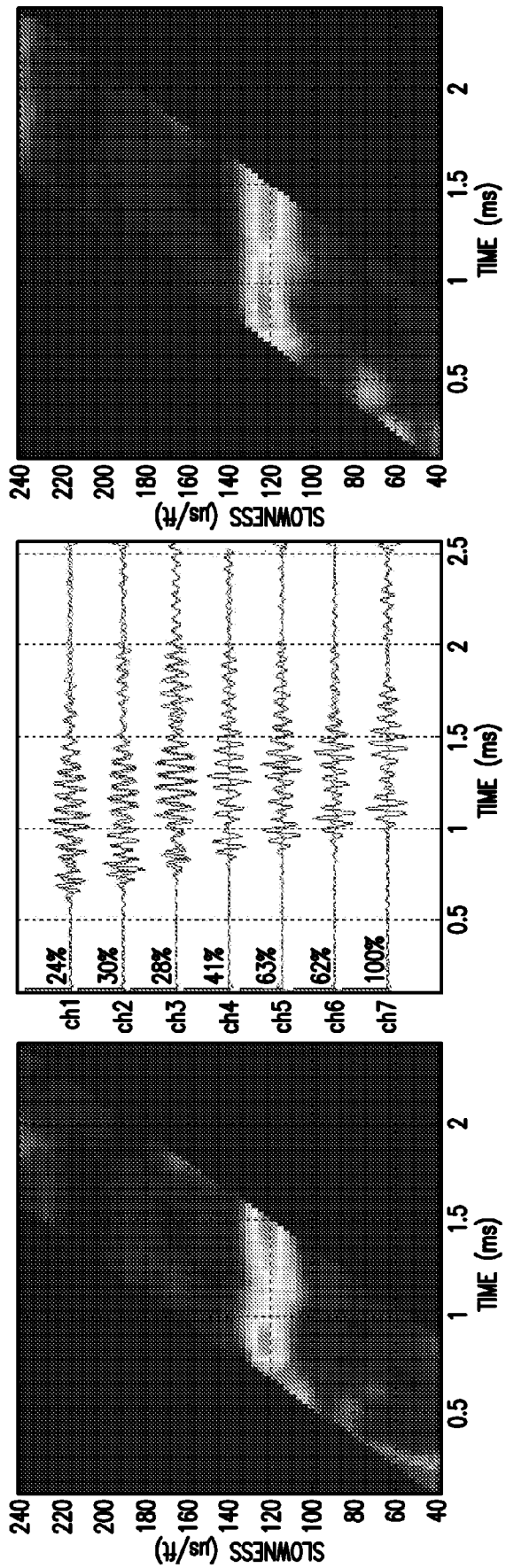
FIGS. 28A-C show shows semblance results and waveforms for opposed receiver arrays.
Figure 28B:
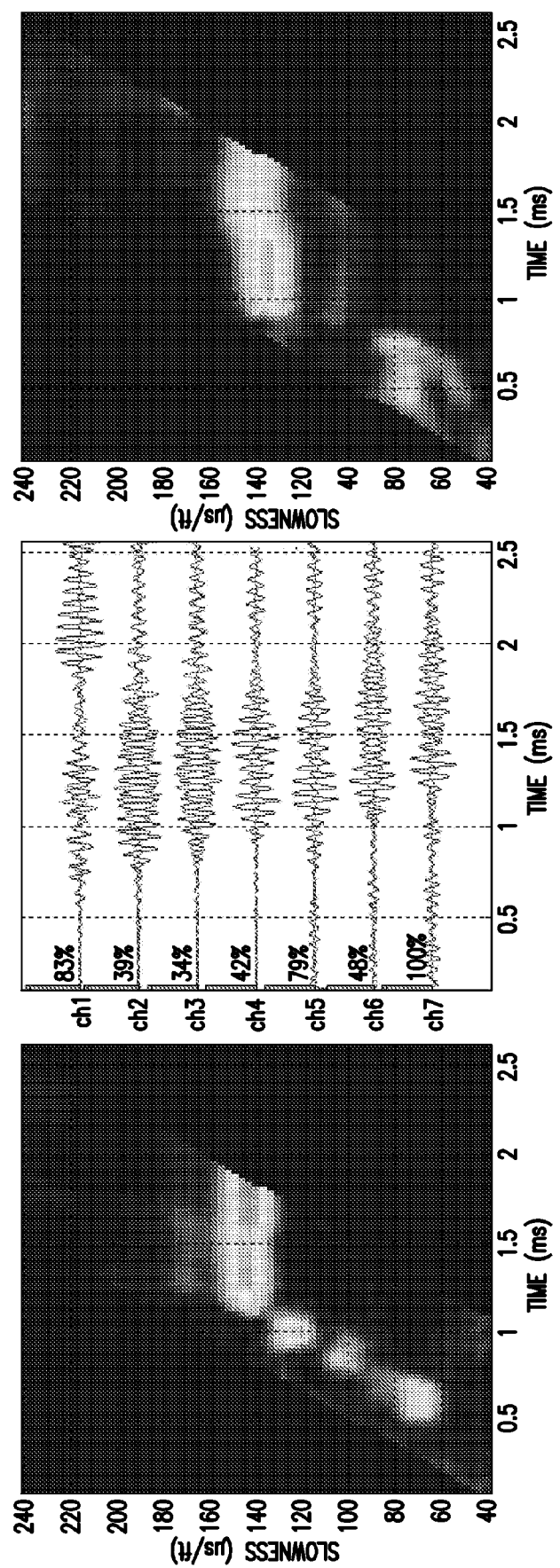
Figure 28C:
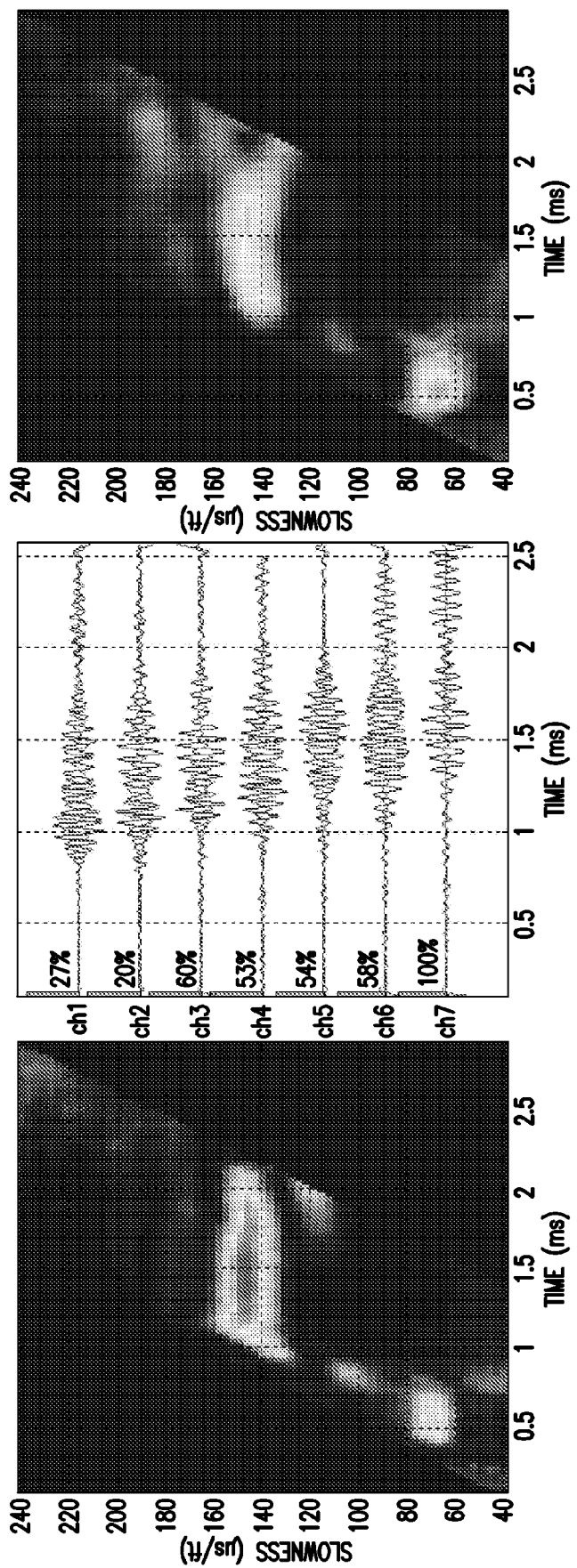

A brief field data example is shown in FIG. 27. In this example, the tool is passing from a formation with compressional slowness of 120 µs/ft to one with a compressional slowness of 140 µs/ft. FIG. 27 shows the well trajectory. FIG. 28 shows semblance results and waveforms for opposed receiver arrays. The left semblance plot in each FIGURE comes from the "front" receiver array and the right semblance plot from the "back" receiver array. The middle plot shows the waveforms from the front and back receiver arrays. FIG. 28A shows an example in which the tool is in the upper formation. FIG. 28B shows the response from the front and back receiver arrays when the tool is approximately 1 foot below the bed boundary and FIG. 28C shows the response when the tool is several feet into the lower formation.

Borehole sonic tools are capable of distinguishing azimuthal variations in velocities around the wellbore, and not just in the sense of crossed-dipole wireline shear anisotropy. Compressional and refracted shear waves are also azimuthally sensitive, easily distinguishing quadrants or better azimuthal variation. The azimuthal resolution does vary by frequency, as does the depth of investigation of the measurements. Azimuthal resolution and depth of investigation are a trade-off, with the application dictating the optimal configuration. For applications such as geosteering (detecting approaching bed boundaries), a combination of frequencies is preferred, with lower frequency waves detecting the approaching bed from a great distance, and higher frequency waves resolving the azimuthal aspect of the approaching bed as the tool approaches the boundary. Anisotropy measurements can be made both with the traditional crossed-dipole method and in azimuthal scanning mode for both wireline and LWD tools, provided that the tool position and hole size are known. The wealth of data provided by azimuthal sonic tools requires thoughtful visualisation methods to decant the data into usable formats.

Figure 29:
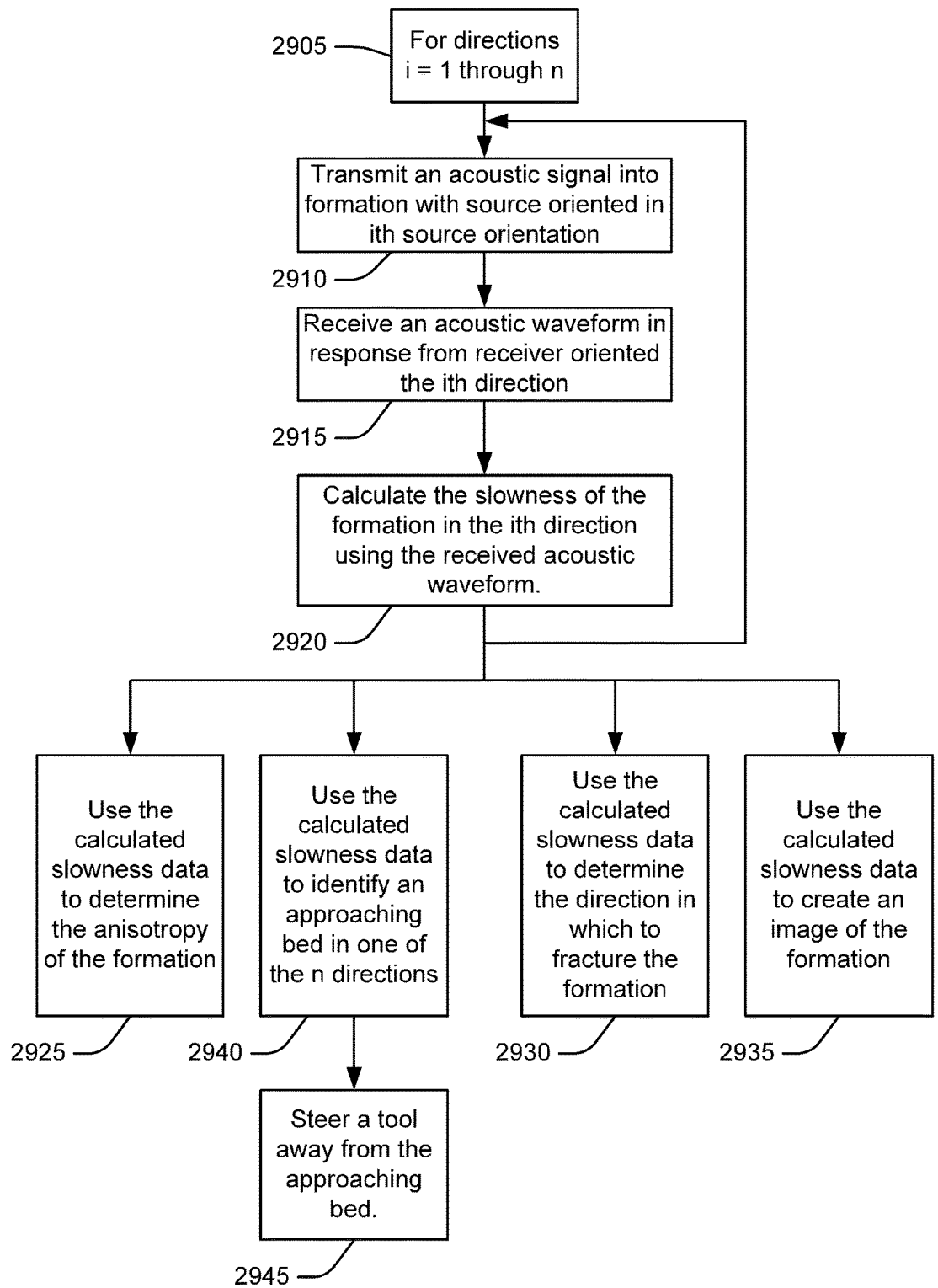
FIG. 29 is a flow chart.

In use, in one embodiment illustrated in FIG. 29, the azimuthal extent of the tool, which is typically 360 degrees, is divided into n divisions. In one embodiment, the n divisions are the 16 segments illustrated in FIG. 6. In one embodiment, the n divisions are of equal size and are evenly spaced. In one embodiment, the n divisions are not all of the same size. In one embodiment, the n divisions are not evenly spaced. In one embodiment, the entire azimuthal extent (i.e., all 360 degrees) of the tool is covered by the n divisions. In one embodiment, the n divisions cover less than all of the azimuthal extent of the tool.

Figure 5:
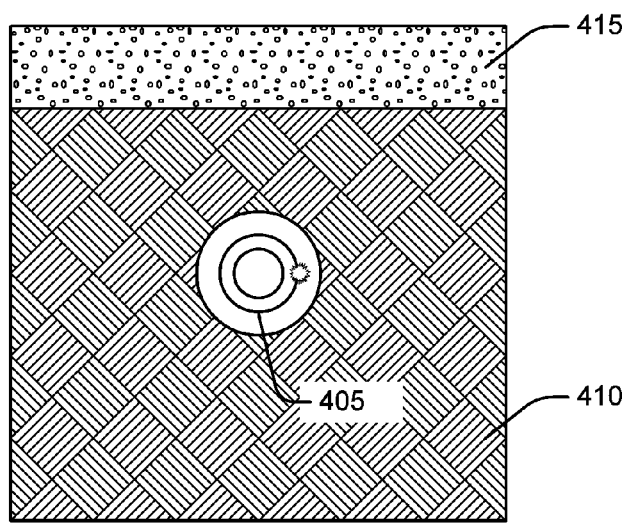

In one embodiment, for each of the directions i=1 through n (block 2905):
An acoustic signal is transmitted by the tool into the formation with the source oriented in the ith source orientation (block 2910). In one embodiment, the formation includes multiple beds, such as beds 410 and 415 illustrated in FIG. 5. In one embodiment the acoustic signal is transmitted in all n directions simultaneously (i.e., the tool transmits as a monopole). In one embodiment, the acoustic signal is transmitted in the n directions in sequence. In one embodiment, the acoustic signal is transmitted in a combination of two or more of the n directions at a time in sequence. In one embodiment, the tool transmits as a multi-pole source.
An acoustic waveform is received in response from the ith direction (block 2915). In one embodiment, the acoustic waveform is received in all n directions simultaneously. In one embodiment, the acoustic waveform is received from the n directions in sequence. In one embodiment, the acoustic waveform is received by pairs or other combinations of receivers in sequence.
The slowness of the formation in the ith direction is calculated using the received acoustic waveform (block 2920).

Once the slowness of the formation in the n directions has been calculated, that data can be used in a variety of ways. For example, in one embodiment, the calculated slowness data can be used to determine the anisotropy of the formation (block 2925). In one embodiment, that information can be used to determine the direction in which to fracture the formation (block 2930). In one embodiment, the calculated slowness data can be used to create an image of the formation (block 2935). In one embodiment, the calculated slowness data can be used to identify an approaching bed in one of the n directions (block 2940). That information can be used to steer the tool away from the approaching bed (block 2945).

Figure 30:
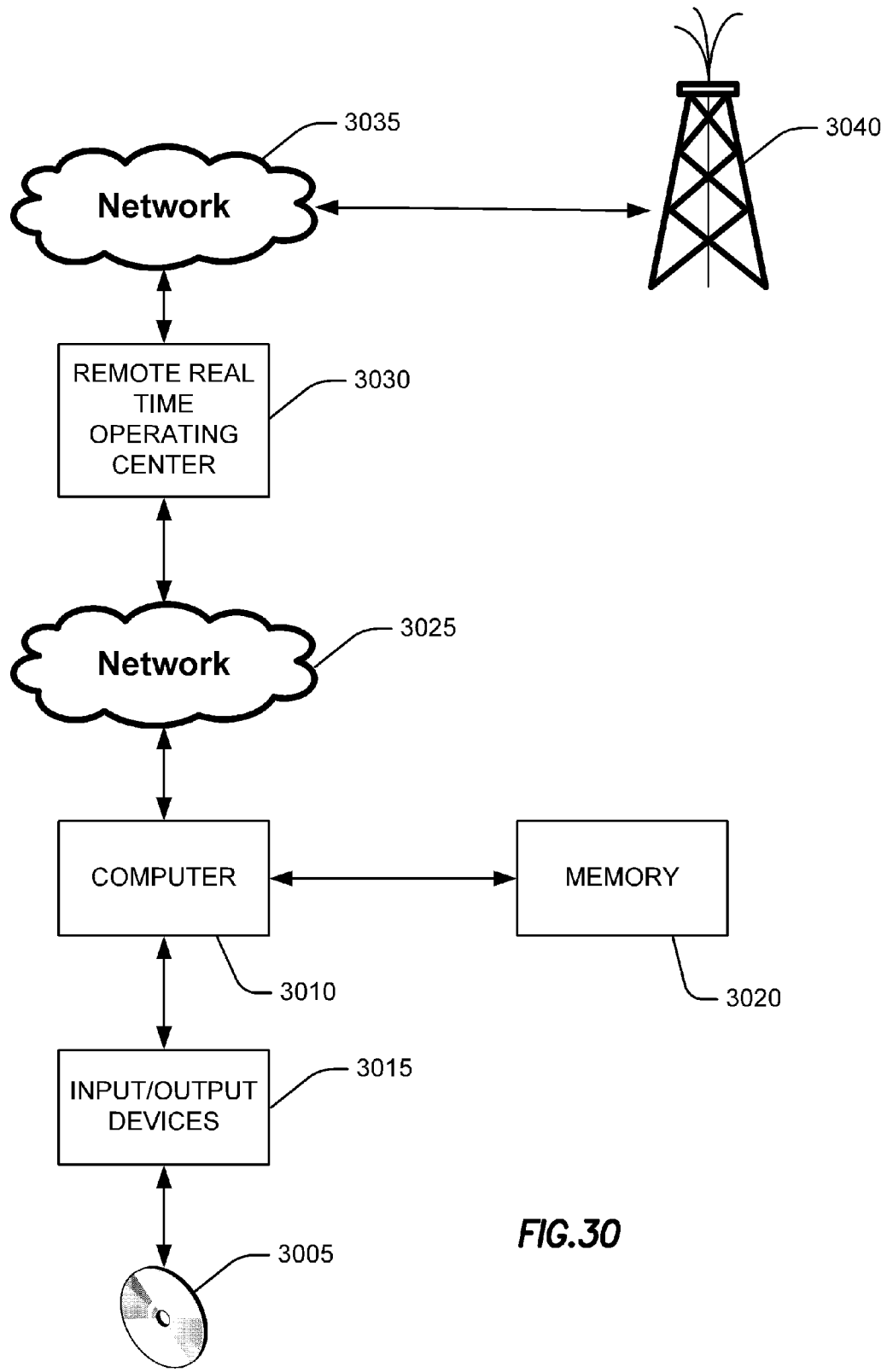
FIG. 30 illustrates a remote real time operating center.

In one embodiment, a computer program for controlling the operation of the acoustic logging tool and for performing analysis of the data collected by the acoustic logging tool is stored on a computer readable media 3005, such as a CD or DVD, as shown in FIG. 30. In one embodiment a computer 3010, which may be the same as computing equipment 48 or which may be below the surface in the drill string, reads the computer program from the computer readable media 3005 through an input/output device 3015 and stores it in a memory 3020 where it is prepared for execution through compiling and linking, if necessary, and then executed. In one embodiment, the system accepts inputs through an input/output device 3015, such as a keyboard, and provides outputs through an input/output device 3015, such as a monitor or printer. In one embodiment, the system stores the results of calculations in memory 3020 or modifies such calculations that already exist in memory 3020.

In one embodiment, the results of calculations that reside in memory 3020 are made available through a network 3025 to a remote real time operating center 3030. In one embodiment, the remote real time operating center makes the results of calculations, available through a network 3035 to help in the planning of oil wells 3040 or in the drilling of oil wells 3040. Similarly, in one embodiment, the acoustic logging tool 200 can be controlled from the remote real time operating center 3030.

The text above describes one or more specific embodiments of a broader invention. The invention also is carried out in a variety of alternate embodiments and thus is not limited to those described here. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:
1. A method comprising:
 deploying an acoustic logging tool in a borehole having a borehole wall, the acoustic logging tool having:
  a longitudinal tool body,
  an X-axis acoustic source coupled to the longitudinal tool body,
  a Y-axis acoustic source coupled to the longitudinal tool body,
  an X-axis acoustic receiver coupled to the longitudinal tool body,
  a Y-axis acoustic receiver coupled to the longitudinal tool body, and
  a caliper to measure an X distance from the X-axis acoustic receiver to the borehole wall and a Y-distance from the Y-axis acoustic receiver to the borehole wall;
 firing the X-axis acoustic source to produce X-axis surface waves on the borehole wall and receiving the

X-axis surface waves at the X-axis acoustic receiver to produce an XX waveform and at the Y-axis acoustic receiver to produce an XY waveform;

firing the Y-axis acoustic source to produce Y-axis surface waves on the borehole wall and receiving the Y-axis surface waves at the X-axis acoustic receiver to produce a YX waveform and at the Y-axis acoustic receiver to produce a YY waveform;

removing delay caused by the transit of the X-axis surface waves and the Y-axis surface waves from the borehole wall to the X-axis acoustic receiver and the Y-axis acoustic receiver from the XX waveforms, the XY waveforms, the YX waveforms, and the YY waveforms using the X distance and the Y distance measured by the caliper to produce a corrected XX waveform, a corrected XY waveform, a corrected YX waveform, and a corrected YY waveform; and calculating a waveform function for waveforms at all azimuths around the longitudinal tool body using the corrected XX waveform, the corrected XY waveform, the corrected YX waveform, and the corrected YY waveform.

2. The method of claim 1 further comprising:
calculating, using the waveform function, semblance functions at a plurality of azimuths around the longitudinal tool body.

3. The method of claim 2 further comprising:
identifying a dominant peak in the semblance functions as a slowness for the respective azimuth.

4. The method of claim 3 further comprising:
using the calculated slowness of the formation in the respected azimuths to determine the anisotropy of a formation.

5. The method of claim 3 further comprising:
using the calculated slowness in the respective azimuths to determine the direction in which to fracture a formation.

6. The method of claim 3 further comprising:
using the calculated slowness in the respective azimuths to identify an approaching bed.

7. The method of claim 6 further comprising:
steering a tool away from the approaching bed.

8. The method of claim 1 wherein the waveform function is:

$$w(\theta)=\cos^2(\theta)(\text{corrected } XX \text{ waveform})+\cos\theta\sin\theta(\text{corrected } XY \text{ wave form}+\text{corrected } YX \text{ wave form})+\sin^2(\theta)(\text{corrected } YY \text{ wave form});$$

where $\theta$ is azimuth.

9. The method of claim 1 further comprising:
rotating the acoustic logging tool in the borehole by an azimuth amount $\varphi$ and repeating firing, receiving, and adjusting to produce a corrected XX-$\varphi$ waveform, a corrected XY-$\varphi$ waveform, a corrected YX-$\varphi$ waveform, and a corrected YY-$\varphi$ waveform; and including the corrected XX-$\varphi$ waveform, the corrected XY-$\varphi$ waveform, the corrected YX-$\varphi$ waveform, and the corrected YY-$\varphi$ waveform in the calculation of the waveform function.

10. The method of claim 1 further comprising:
rotating the acoustic logging tool in the borehole by N azimuth amounts (where N may be 1) $\varphi_i$, i =1, N and at each $\varphi_i$ repeating firing, receiving and removing delay caused by the transit of the X-axis surface waves and the Y-axis surface waves from the borehole wall to the X-axis acoustic receiver and the Y-axis acoustic receiver from the XX waveforms, the XY waveforms, the YX waveforms, and the YY waveforms using the X distance and the Y distance measured by the caliper to produce at each value of $\varphi_i$ a corrected XX waveform $XX_i$, a corrected XY waveform $XY_i$, a corrected YX waveform $YX_i$, and a corrected YY waveform $YY_i$.

11. The method of claim 10 wherein the waveform function is:

$$w(\varphi, i)=\cos^2(\theta-\varphi_i)XX_i+\cos(\theta-\varphi_i)\sin(\theta-\varphi_i)(XY_i+YX_i)+\sin^2(\theta-\varphi_i)YY_i;$$

where $\theta$ is azimuth.

12. The method of claim 1 wherein the X-axis acoustic source and the Y-axis acoustic source are cross-dipole sources.

* * * * *